United States Patent [19]

Nakazawa et al.

[11] Patent Number: 5,729,359
[45] Date of Patent: Mar. 17, 1998

[54] IMAGE READING APPARATUS

[75] Inventors: Eiji Nakazawa, Nirasaki; Satoshi Nezu, Yamanashi-ken, both of Japan

[73] Assignee: Nisca Corporation, Yamanashi-ken, Japan

[21] Appl. No.: 558,141

[22] Filed: Nov. 13, 1995

[30] Foreign Application Priority Data

Nov. 11, 1994 [JP] Japan .................. 6-302765

[51] Int. Cl.$^6$ .................................................. H04N 1/04
[52] U.S. Cl. .................. 358/498; 358/296; 358/496; 355/24; 399/302; 399/388
[58] Field of Search .................. 358/498, 496, 358/497, 296; 355/131, 48, 50, 24; 399/302, 322, 367, 374, 388, 369, 397, 401

[56] References Cited

U.S. PATENT DOCUMENTS

| | | | |
|---|---|---|---|
| 4,424,535 | 1/1984 | Rothbart et al. | 358/498 |
| 4,794,419 | 12/1988 | Shibazaki | 355/3 R |
| 4,962,430 | 10/1990 | Hiroki et al. | 358/296 |
| 5,060,018 | 10/1991 | Watanabe | 355/230 |
| 5,348,281 | 9/1994 | Yamada | 271/3.1 |
| 5,513,017 | 4/1996 | Knodt et al. | 358/471 |
| 5,535,012 | 7/1996 | Matsumoto | 358/498 |
| 5,579,099 | 11/1996 | Nishiyama | 399/371 |
| 5,579,129 | 11/1996 | Iwata et al. | 358/498 |
| 5,644,663 | 7/1997 | Saito et al. | 382/313 |

*Primary Examiner*—Edward L. Coles, Sr.
*Assistant Examiner*—Madeleine Au Nguyen
*Attorney, Agent, or Firm*—Kanesaka & Takeuchi

[57] ABSTRACT

An image reading apparatus is formed of a main portion having an image reading function; a driving source provided in the main portion; a reversing device, on which the main portion is detachably mounted; and a driving power transmitting device connected to the driving source. The reversing device has a device to reverse a document fed from the main portion in a state where the main portion is mounted thereto and to return the document back to the main portion. The driving power transmitting device drives the reversing device by transmitting a driving power from the driving source under a condition that the main portion is mounted on the reversing device. Thus, although the reversing device is not provided with a driving source, the reversing device can be actuated.

20 Claims, 33 Drawing Sheets

IMAGE READING APPARATUS

BACKGROUND OF THE INVENTION AND RELATED ART STATEMENT

The invention relates to an image reading apparatus including a main portion having an image reading function and provided with a driving source therein.

Heretofore, as an image reading apparatus for reading an image of a document, for example, an image scanner has been known and widely used. Here, generally, the image scanner is constructed to read one surface of the document (specifically, an upper surface). Therefore, in case a document is a two-side document having images on upper and lower surfaces, an operator once places a front surface of the document upward to read the image on the front surface, and thereafter the operator places a back surface upward by reversing the document to read the image on the back surface thereof.

An image reading operation of the two-side document as described above is very tiresome, so that a document reversing device capable of reversing a document has been developed recently and used.

However, the conventional document reversing device has a driving motor, as a driving source, therein for reversing a document transferred from a scanner device. Therefore, there have been problems such that the device becomes expensive, and at the same time, an operation for coupling the scanner device and the document reversing device becomes tiresome since the document reversing device and the scanner device must be electrically connected in order to control driving of the driving motor in synchronism with that in the scanner device. Thus, solutions for the problems have been expected.

The present invention has been made in view of the above described problems, and an object of the invention is to provide an image reading apparatus wherein even if a document reversing device is not provided with a driving source, the document reversing device is driven by receiving a driving force from a driving source of a main portion in a state where the document reversing device is mounted to the main portion, so that a whole construction of the apparatus can be simplified and a cost can be reduced.

Also, another object of the present invention is to provide an image reading apparatus wherein in case the scanner device and the document reversing device are coupled, it is not necessary to electrically connect both of them, so that workability for the coupling operation can be improved.

Also, still further object of the present invention is to provide an image reading apparatus wherein even if a document feeding device is not provided with a driving source, the document feeding device is driven by receiving the driving force from the driving source of the main portion, so that a whole construction of the apparatus can be simplified and a cost can be reduced.

SUMMARY OF THE INVENTION

In order to solve the above described problems and attain the objects, an image reading apparatus according to the present invention, for example, according to a first aspect of the invention comprises a main portion having an image reading function; a driving source stored in the main portion; reversing means detachably attached to the main portion and being capable of reversing a document transferred from the main portion in a state where the main portion is mounted thereto; and driving power transmitting means for driving the reversing means by transmitting a driving force from the driving source in the state where the main portion is mounted to the reversing means.

DETAILED DESCRIPTION OF PREFERRED EMBODIMENTS

Hereinunder, a structure of an embodiment of an image reading apparatus according to the present invention which has been applied to an image scanner is described in detail by referring to the attached drawings.

Figure 1:
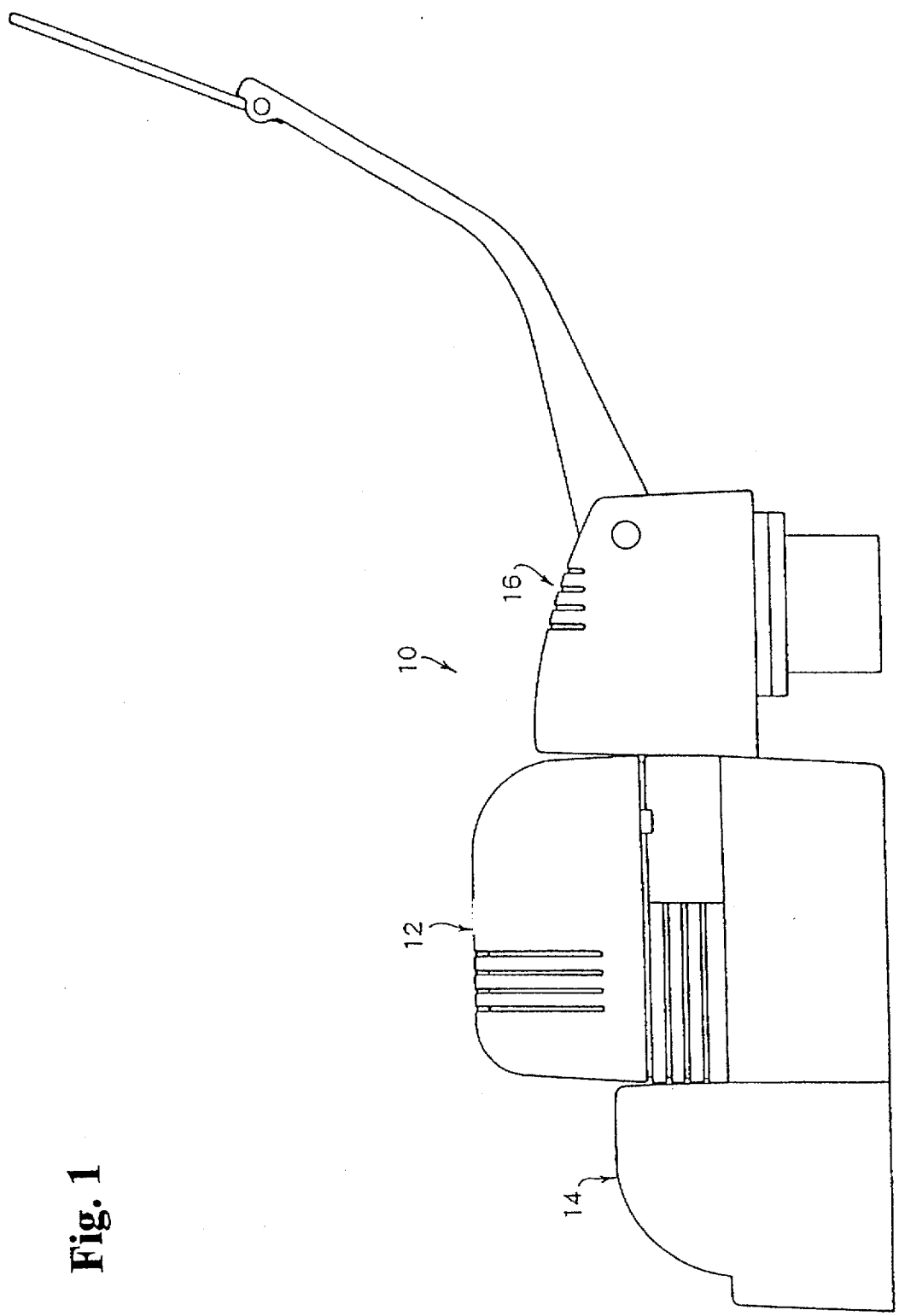
FIG. 1 is a front view for schematically showing a structure of an embodiment of an image reading apparatus according to the present invention in a state where the image reading apparatus is applied to an image scanner.
Figure 2:
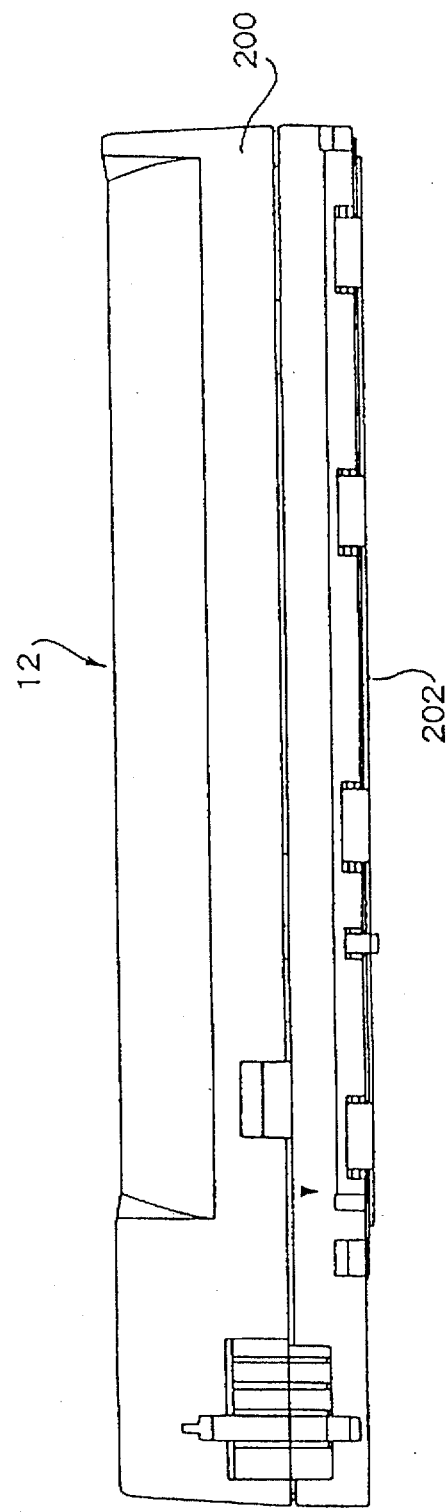
FIG. 2 is a right side view of a scanner device alone taken out from the image scanner shown in FIG. 1.
Figure 3:
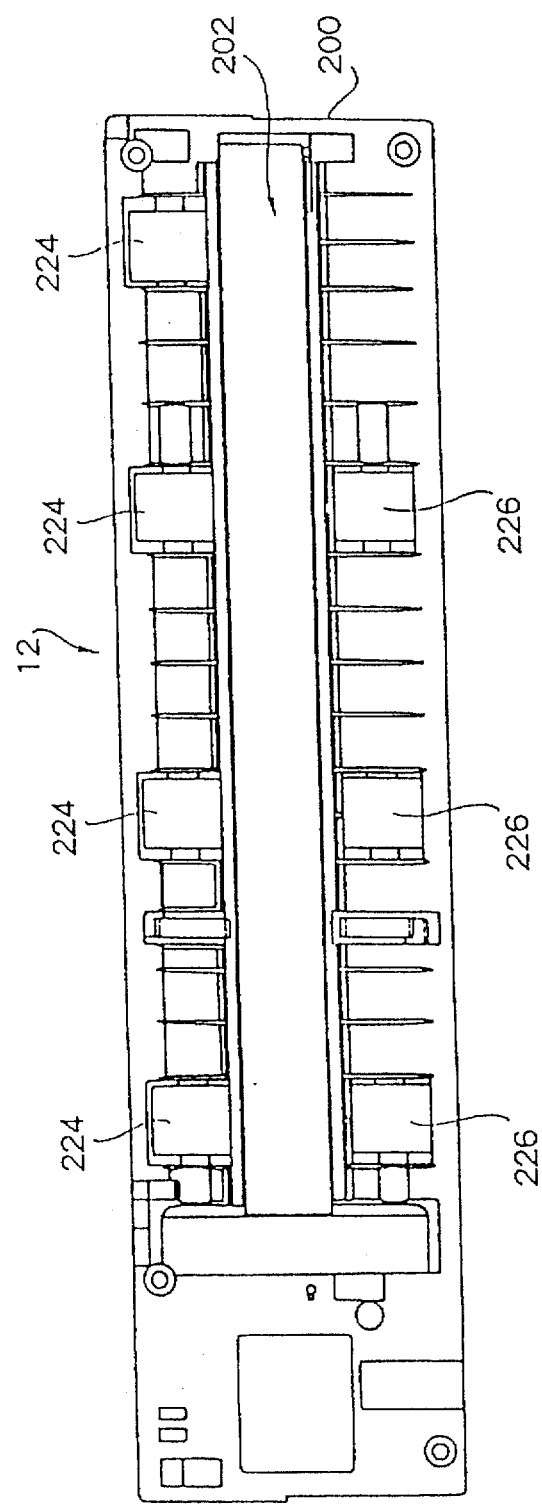
FIG. 3 is a bottom plan view showing a bottom shape of the scanner device shown in FIG. 2.
Figure 4:
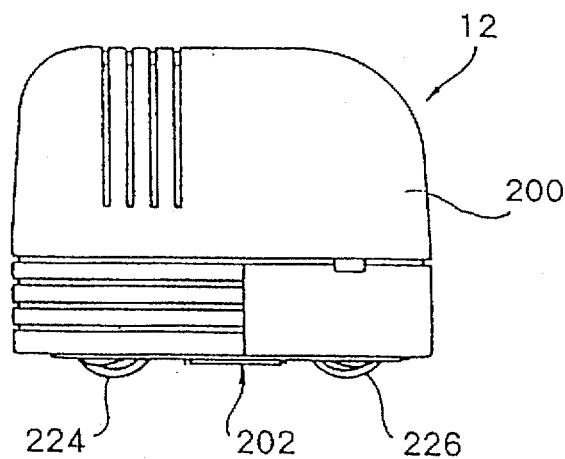
FIG. 4 is a front view for showing a front shape of the scanner device shown in FIG. 2.
Figure 5:
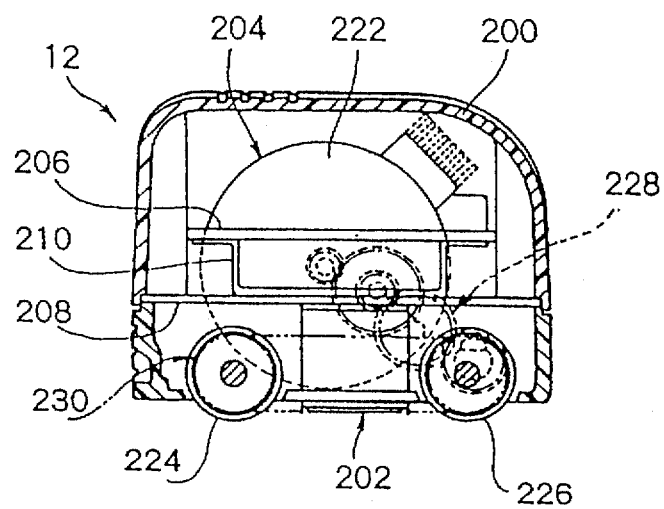
FIG. 5 is a front section view showing an inner structure of the scanner device shown in FIG. 2.

As shown in FIG. 1, an image scanner 10 of this embodiment comprises: a scanner device 12; an automatic document reversing device 14 where a document with an image on an upper surface (i.e. front surface) read at the scanner device 12 is reversed, and the document is again fed (i.e. returned) to the scanner device 12 in a state where the document has a back surface as an upper surface; and an automatic document feeding device 16 for automatically feeding the document to the scanner device 12. In this embodiment, the automatic document reversing device 14 and the automatic document feeding device 16 are detachably mounted to the scanner device 12, respectively. Also, under a condition that the automatic document feeding device 16 and the automatic document reversing device 14 are not mounted thereto, the scanner device 12 alone constitutes, what is called, the image scanner 10 of a self-moving type (or a document fixed type) where the scanner device 12 alone moves over the document to read an image thereof.

Here, under a condition that the automatic document reversing device 14 has been mounted to the scanner device 12, the automatic document feeding device 16 is adapted to be detachably mounted to the scanner device 12. While a detailed description thereof is given later, the automatic document reversing device 14 has a function switchable between a passing-through function where the document fed from the scanner device 12 is passed through as it is and then ejected, and a reversing function where the document fed from the scanner device 12 is reversed and returned to the scanner device 12. Under the condition that the automatic document reversing device 14 thus constructed is mounted to the scanner device 12, the assembled structure functions as an image scanner 10 of, what is called, a fixed type (or document transferring type) to read the image of the document by transferring the document.

Also, as one of features of this embodiment, both the automatic document reversing device 14 and the automatic document feeding device 16 do not have driving sources therein, but are structured to be respectively driven by a driving power transmitted from a driving source built in the scanner device 12. The specific structure for transmitting the driving power is described later in detail.

The scanner device 12, as shown in FIGS. 2 through 5 wherein it is taken out, mainly comprises a scanner housing 200; a close attachment type image reader 202 which is housed in the scanner housing 200, and has an image reading surface at its lower surface projecting downward from a lower surface of the scanner housing 200; a driving mechanism 204 (shown in FIG. 5) for drivingly allowing the scanner device 12 to move over the document in case the scanner device 12 alone is used as the self-moving type, or for drivingly transferring the document in case the scanner device 12 is used as the fixed type in the condition that at least the automatic document reversing device 14 is mounted thereto; and a circuit substrate 206 (shown in FIG. 5) incorporating therein an information processing circuit for producing image information of the document from information read by the image reader 202 and relative moving distance information of the document and the image reader 202 through the driving mechanism 204, and outputting the image information to an outside image processing device (not shown).

The image reader 202 is, what is called, a line sensor comprising a plurality of image reading elements arranged in a line (for example, CCD) wherein an image reading surface is disposed in an exposed state at an approximately center portion of a lower surface of the scanner housing 200 so that the image reader 202 is extended in a direction perpendicular to an image reading direction. (Namely, the image reader 202 is extended in a direction perpendicular to a moving direction of the scanner device 12 in case the image scanner 10 is used as the self-moving type; and the image reader 202 is extended in a direction perpendicular to a document transferring direction in case the image scanner 10 is used as the fixed type.)

The image reader 202 is firmly attached to a lower surface of a fitting stay 208 fixed in the scanner housing 200, and the circuit substrate 206 is firmly attached to an upper surface of the fitting stay 208 through a spacer 210. And, the image reader 202 and the circuit substrate 206 are electrically connected to each other through a connecting cable (not shown).

Figure 6:
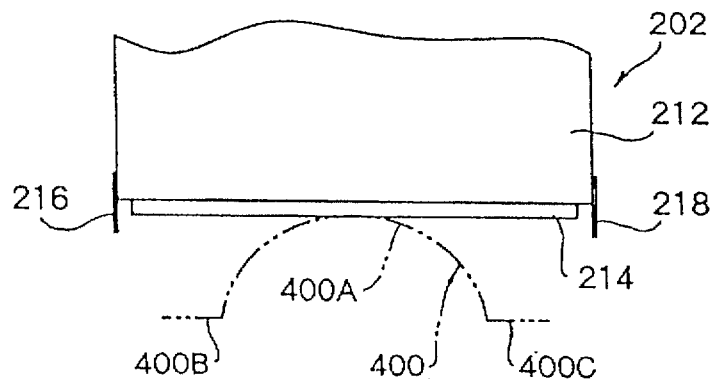
FIG. 6 is a front view for showing a structure, in a taken-out state, of an essential part of an image reader.

Here, as shown in FIG. 6 in an enlarged state in detail, the image reader 202 is provided with a reader device 212 having an image reading element built therein, and a glass plate 214 as a transparent member which is attached to a lower surface of the reader device 212 and functions as the image reading surface and a document guide surface. The glass plate 214 is slightly projected downward from the lower surface of the reader device 212. Here, to the scanner device 12, the document is carried in from a right side in the drawing in case the scanner device 12 is used as the fixed type, and under the condition that the automatic reversing device 14 is mounted thereto, the document is carried in from the right side and left side. In other words, the document can be fed to the scanner device 12 from any direction of the right and left sides in the drawing.

Therefore, in this embodiment, even if the document is fed from any directions of the right side and left side, in order to prevent the document from being caught to be jammed by an edge surface of the glass plate 214 (i.e. a stepped portion defined by the reader device 212 and the glass plate 214) on the feeding side, the reader device 212 is provided with guide plates 216, 218 projecting downward, respectively, by a predetermined length from both the right and left sides of a lower surface thereof as shown in the drawing. More specifically, both the guide plates 216, 218 are disposed with the predetermined length suspended from the lower surface of the reader device 212.

Here, both the guide plates 216 and 218 are formed of a soft material having flexibility, and in this embodiment, formed of a thin Mylar sheet. Also, the above mentioned "predetermined length" is set such that each lower end of the glass plates 216, 218 can be slightly overlapped (i.e. held) on a corresponding edge of the glass plate 214 in a state where each lower edge of the guide plates 216, 218 is curved by the carried-in document.

Figure 7:
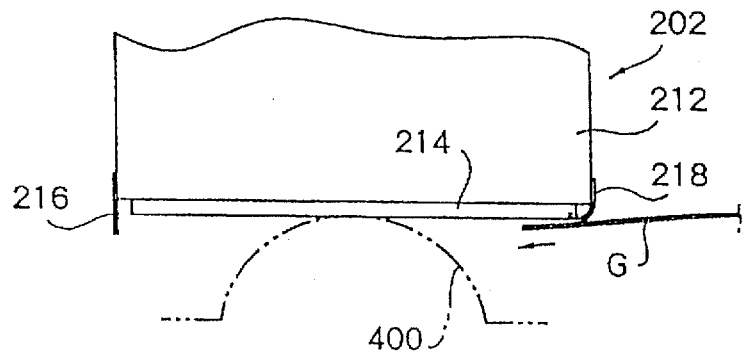
FIG. 7 is a front view for showing a state where a document is transferred from a right side, in a state shown in FIG. 6.
Figure 8:
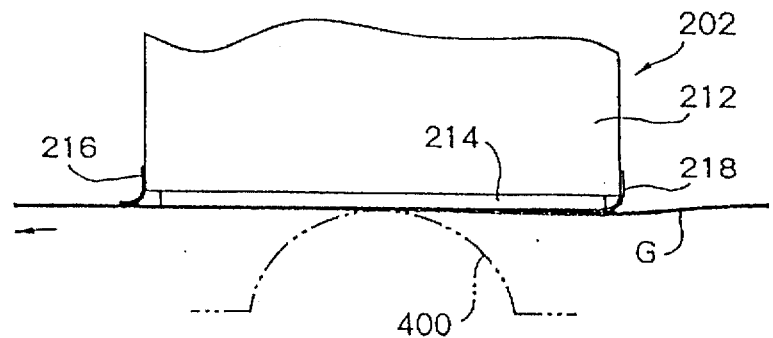
FIG. 8 is a front view for showing a state where the document is further transferred to a left side from the state shown in FIG. 7.

As described hereinabove, by provision of a pair of the guide plates 216, 218 on the left side and the right side, in case a document G is transferred toward the left side in the drawing from the automatic document feeding device 16 (or by hand), as shown in FIG. 7, a forward end of the document G first abuts against the guide plate 218 on the right side, and bends the guide plate 218 toward the left side in the drawing. Then, the document G is guided under a lower surface of the glass plate 214 along the bent guide plate 218 on the right side without jamming, and introduced between a document press member 400 which is described later and the glass plate 214, and an upper surface (front surface) of the document is read at a point when the document passes through a revolvingly contact portion of the glass plate 214 and the document press member 400. Then, the document G, the image of which has been read, as shown in FIG. 8, bends the guide plate 216 on the left side toward left in the drawing, and is then transferred toward the automatic document reversing device 14.

Figure 9:
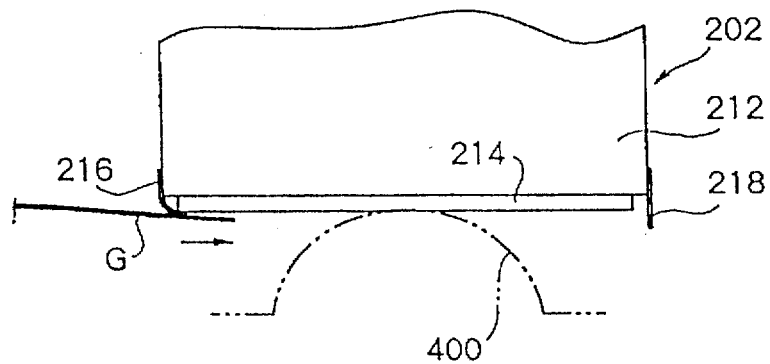
FIG. 9 is a front view for showing a state where the document is transferred from the left side, in the state shown in FIG. 6.
Figure 10:
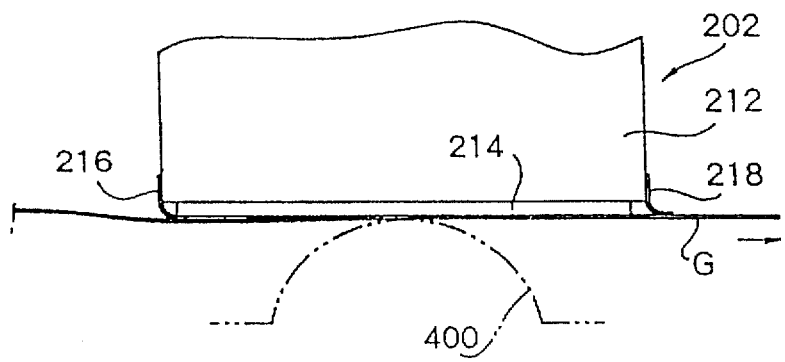
FIG. 10 is a front view for showing a state where the document is further transferred to the right side, from the state shown in FIG. 9.

In case the reversed document G is transferred from the automatic document reversing device 14 toward the right side in the drawing, as shown in FIG. 9, a forward end of the reversed document G first abuts against the guide plate 216 on the left side, and bents the guide plate 216 toward the right side in the drawing. Then, the document G is guided under the lower surface of the glass plate 214 along the bent left guide plate 216 without jamming, and introduced between the document press member 400 and the glass plate 214, and an image on an upper surface (back surface) of the document is read at a point when the document passes through the revolvingly contact portion of the glass plate 214 and the document press member 400. Then, the document G, an image of which on the back surface has been read, as shown in FIG. 10, bends the guide plate 218 on the right side toward right in the drawing, and then is ejected from the scanner device 12 to an outside through a reversed document ejecting port 220 defined between a lower right end of the scanner housing 200 and an upper right end of a stand 408 of the automatic document reversing device 14 which is described later.

As described above, in the present embodiment, by provision of a pair of guide plates 216, 218 on the left and right sides, even in case the images of both sides of the document G are read, the document G is certainly transferred without jamming while sliding along the image reading surface defined at the lower surface of the glass plate 214, and the images can be surely read. As described hereinabove, reliability of the image scanner 10 of the present embodiment has been extremely improved.

The driving mechanism 204 provided to the scanner device 12, as shown in FIG. 5 again, includes a driving motor 222 formed of a reversibly rotatable stepping motor as a driving source; moving rollers 224, 226 provided on the left and right sides of the image reader 202, respectively, in the drawing; a first driving power transmitting mechanism 228 for transmitting a driving power from the driving motor 222 to the moving roller 226 on the right side in the drawing; and a second driving power transmitting mechanism 230 for transmitting the driving power, which is transmitted to the moving roller 226 on the right side in the drawing, to the moving roller 224 on the left side in the drawing.

Figure 11:
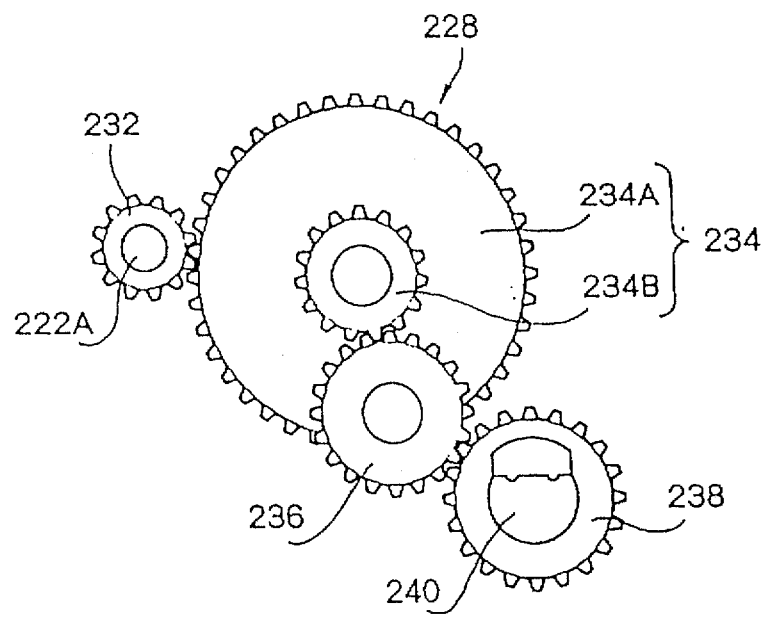
FIG. 11 is a front view for showing a structure, in a taken-out state, of a first driving power transmitting mechanism in a driving mechanism provided in the scanner device.

Here, the first driving power transmitting mechanism 228, as shown in FIG. 11, includes a driving gear 232 coaxially fixed to a motor shaft 222A of the driving motor 222; an intermediate gear 234 integrally formed with a larger diameter gear portion 234A which is engaged with the driving gear 232 and a smaller diameter gear portion 234B coaxially supported with the larger diameter gear portion 234A; an idle gear 236 engaged with the smaller diameter gear portion 234B; a driven gear 238 engaged with the idle gear 236; and a first driven shaft 240 rotatably supported in the scanner housing 200 and coaxially fixed with the driven gear 238.

In the first driven shaft 240, a plurality of the moving rollers 226 on the right side is coaxially fixed along an axial direction of the shaft, and in accordance with a driving state, such as driving the driving motor 222 in a clockwise direction or in a counter-clockwise direction in the drawing, the moving rollers 226 on the right side are rotated in the counter-clockwise direction or in the clockwise direction. In other words, the moving rollers 226 on the right side are rotatably driven by the driving motor 222 in a direction opposite to the driving direction of the motor 222.

Figure 12:
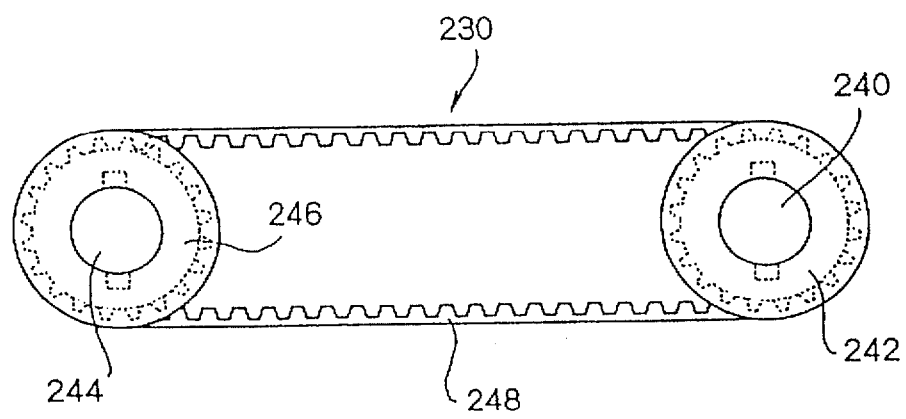
FIG. 12 is a front view for showing a structure, in a taken-out state, of a second driving power transmitting mechanism in the driving mechanism provided in the scanner device.
Figure 13:
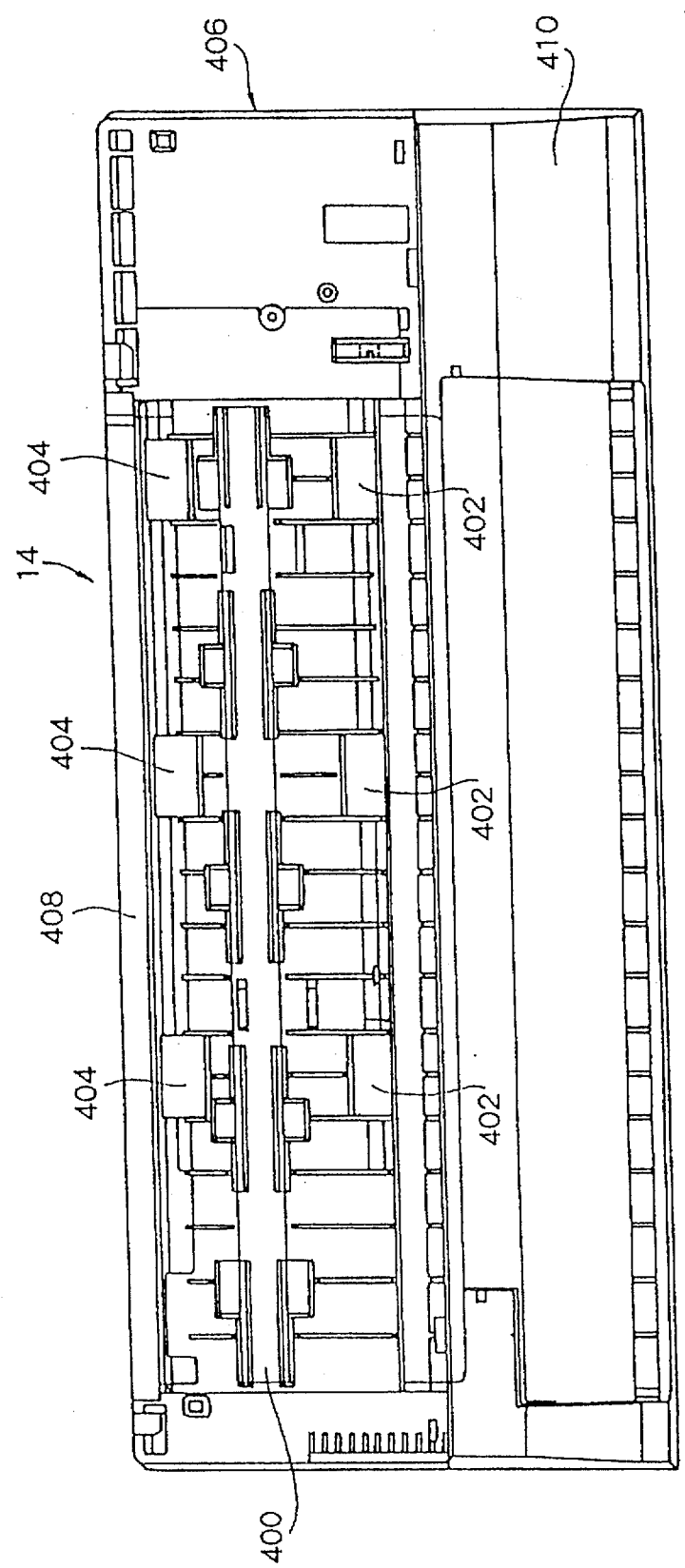
FIG. 13 is a top plan view showing only an automatic document reversing device taken out from the image scanner shown in FIG. 1.
Figure 14:
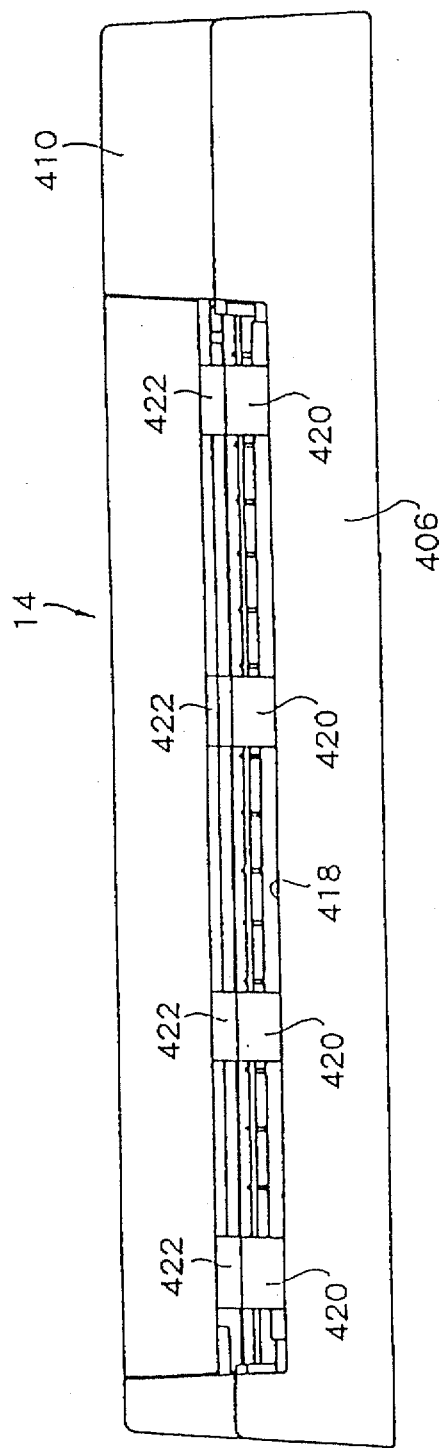
FIG. 14 is a left side view showing a shape of the left side of the automatic document reversing device shown in FIG. 13.

Also, the second driving power transmitting mechanism 230, as shown in FIG. 12, includes a driving pulley 242 coaxially fixed to one end of the first driven shaft 240; a second driven shaft 244 coaxially provided with a plurality of the moving rollers 224 on the left side fixed along the axial direction, and rotatably supported in the scanner housing 200; a driven pulley 246 coaxially fixed to one end of the second driven shaft 244; and a toothed endless timing belt 248 extended around the driving pulley 242 and the driven pulley 246 to thereby connect them. Since the second driving power transmitting mechanism 230 is thus constructed, in accordance with rotation of the moving rollers 226 on the right side, the moving rollers 224 on the left side are rotated in the same direction and in a synchronous state as therein.

As described above, in the present embodiment, when the driving motor 222 is driven, a pair of the moving rollers 224, 226 on the left and right sides is rotated in a clockwise direction or a counter-clockwise direction in the drawing through the first and second driving power transmitting mechanisms 228, 230. Incidentally, a motor shaft 222A of the driving motor 222 is provided with a rotary encoder (not shown) for detecting a rotation amount thereof. The rotary encoder is electrically connected to the circuit substrate 206 through a connecting cable (not shown). An information processing circuit incorporated in the circuit substrate 206 calculates a moving amount of the scanner device 12 (i.e. a relative moving amount of the document and the image reader 202) based on a detected output from the rotary encoder, and generates image information of the document based on the calculated moving amount and the read information from the image reader 202.

Here, the lower surface of the glass plate 214 of the image reader 202 is set at a position of the same height as a segment connecting revolvingly contact portions of the moving rollers 224, 226 paired on the left and right sides contacting the surface of the document, or a position slightly indented inward from the segment. Therefore, according to the present embodiment, in case the scanner device 12 is used independently, in other words, in case the image scanner 10 comprising only the scanner device 12 is used as the self-moving type, by starting the driving mechanism 204 to rotate the pair of moving rollers 226, 228 on the left and right sides, the scanner device 12 disposed over the document self-moves over the document and reads an image of the document while self-moving.

Under the condition that the scanner device 12 is mounted to the automatic document reversing device 14 described later, the pair of moving rollers 224, 226 on the left and right sides functions as a pair of reversing rollers on the left and right sides. The respective reversing rollers 224, 226 revolvingly contact with back-up rollers 402, 404 (described later) provided in the automatic document reversing device 14; and the document is sandwiched between the reversing roller 224 on the left side in the drawing and the corresponding back-up roller 402 on the left side in the drawing to be revolvingly contacted therewith, and between the reversing roller 226 on the right side in the drawing and the corresponding back-up roller 404 on the right side in the drawing to be revolvingly contacted therewith so that the document is transferred when both the reversing rollers 224, 226 are rotated.

The automatic document reversing device 14, as shown in FIGS. 13 through 16, is provided with a reversing housing 406, and at a right side portion of the reversing housing 406 in the drawing, a stand 408 is formed in a recessed state for receiving thereon the scanner device 12 having a structure as described above. Upper portions of the back-up rollers 402, 404 are slightly exposed from an upper surface of the stand 408, and the back-up rollers 402, 404 are positioned to revolvingly contact, from a lower side, with the respective reversing rollers 224, 226 of the scanner device 12 in a condition that the scanner device 12 is placed on the stand 408.

Also, the upper surface of the stand 408 is provided with an opening (not shown) for allowing the document press member 400 to resiliently abut against the image reader 202 of the scanner device 12 placed on the stand. Incidentally, the document press member 400 is formed of a spring member, and is constructed such that under the condition that the scanner device 12 is placed on the stand 408, the document press member 400 resiliently abuts, from a lower side, against the lower surface of the glass plate 214 of the image reader 202, and the document transferred to the image reader 202 is closely contacted with the lower surface of the glass plate 214.

Specifically, the document press member 400 includes an arc shape main press portion 400A and flat attaching portions 400B, 400C integrally connected to the both sides of the main press portion 400A, and thus formed document press member 400 is integrally made of a spring material (FIG. 6). And, the arc shape main press portion 400A resiliently abuts against the lower surface of the glass plate 214 at an approximately curved center portion thereof. Incidentally, the document press member 400 is fixed to attaching portions (not shown) of the reversing housing 406 at the flat attaching portions 400B, 400C at the both ends thereof.

Figure 15:
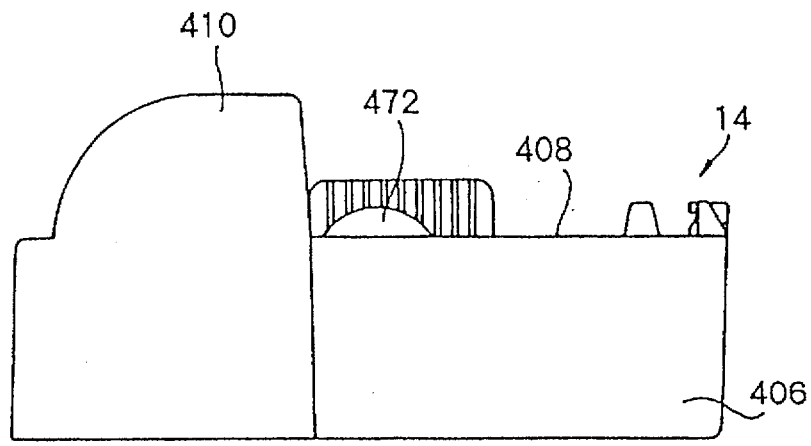
FIG. 15 is a front view for showing a shape of a front side of the automatic document reversing device shown in FIG. 13.

Also, in a left side portion of the reversing housing 406 in the drawing, a reversing unit receiving portion 410 extending higher than the stand 408 is defined (FIG. 15). The reversing unit receiving portion 410, described later in detail, stores a reversing unit 412 for reversing the document fed from the scanner device 12 and returning to the scanner device 12, and a third driving power transmitting mechanism 414 for reversibly transmitting the driving power of the driving motor 222 to the reversing unit 412.

At a lower end of the reversing unit receiving portion 410 on a right side portion thereof in the drawing, i.e. at a portion continuously connected to the upper surface of the stand 408, a document in-take port 416 is formed, and at an intermediate portion on the left side surface in the drawing, i.e. at the same level portion as the document in-take port 416, a document ejecting port 418 for ejecting the non-reversing document is formed. And, a document reversing transferring path is defined by a flat surface connecting the document in-take port 416 and the document ejecting port 418.

Figure 16:
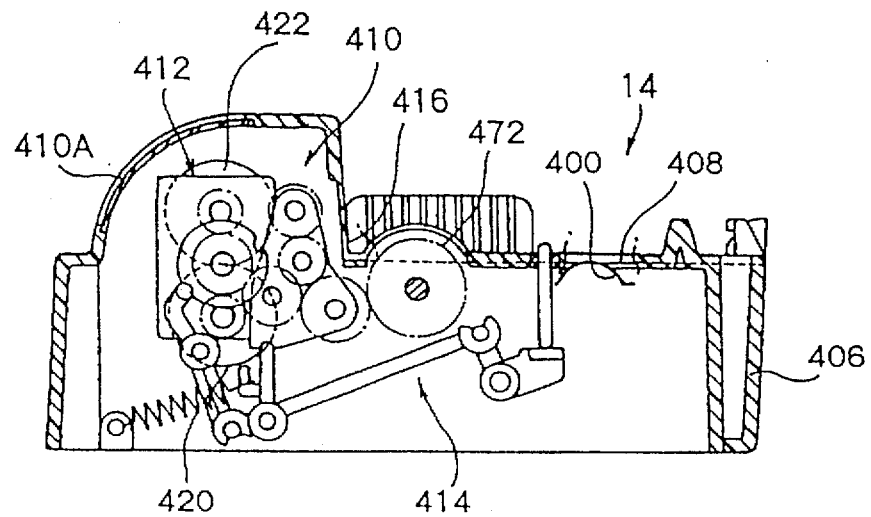
FIG. 16 is a front section view for showing an inner structure of the automatic document reversing device shown in FIG. 13.

As shown in FIG. 16, on an upper side portion of the reversing unit receiving portion 410, a jammed document removing door 410A is formed in order to remove the jammed document in case the document is jammed therein. The door 410A is closed and can not be opened by being blocked with the scanner device 12 under the condition that the scanner unit 12 is placed on the stand 408. As the result, in the present embodiment, in case the document is jammed in the reversing unit receiving portion 410, the scanner device 12 is first removed from the stand 408, and then the door 410A is opened, so that the jammed document can be taken out. More specifically, when the jammed document is taken out, a driving power to the automatic document reversing device 14 is forcibly cut off. As a result, it is possible to effectively solve a problem that an unnecessary holding power acts on the document to thereby tear the document when the jammed document is taken out.

The automatic document reversing device 14 is constructed such that a forward edge (a left edge in the drawing) of a document transferred from the scanner device 12 is held between a pair of reversing rollers 420, 422 provided to the reversing unit 412; the reversing rollers 420, 422 are respectively rotated (rotating on their own axes) around their own central axes so that the document is transferred toward left in the drawing until a terminal edge portion (a right edge in the drawing) of the document is held by the reversing rollers 420, 422; then, by revolving (revolving around a common axis) the reversing rollers 420 and 422 around an intermediate point therebetween as a center by 180 degrees as a whole, the terminal edge portion of the document held between the reversing rollers 420 and 422 is transferred toward left in the drawing; further, by rotating the rollers 420, 422 on their own axes in the same direction, the document is transferred toward left in the drawing until the forward edge portion of the reversed document (a right edge portion in the drawing since the document has been reversed) is held between the reversing rollers 420, 422; and finally, by rotating the reversing rollers 420, 422 on their own axes in an opposite direction, the reversed document is transferred toward right in the drawing to return the reversed document to the scanner device 12.

Hereinunder, first, a structure and an operation of the reversing unit 412 for performing the above operation are explained in detail referring to FIGS. 17 through 22; then, a structure and an operation of the third driving power transmitting mechanism 414 are explained in detail referring to FIGS. 23 through 26; and finally, a reversing operation of a document in the automatic document reversing device 14 provided with the reversing unit 412 and the driving power transmitting mechanism 414 is explained in detail referring to FIGS. 27 through 37.

Figure 17:
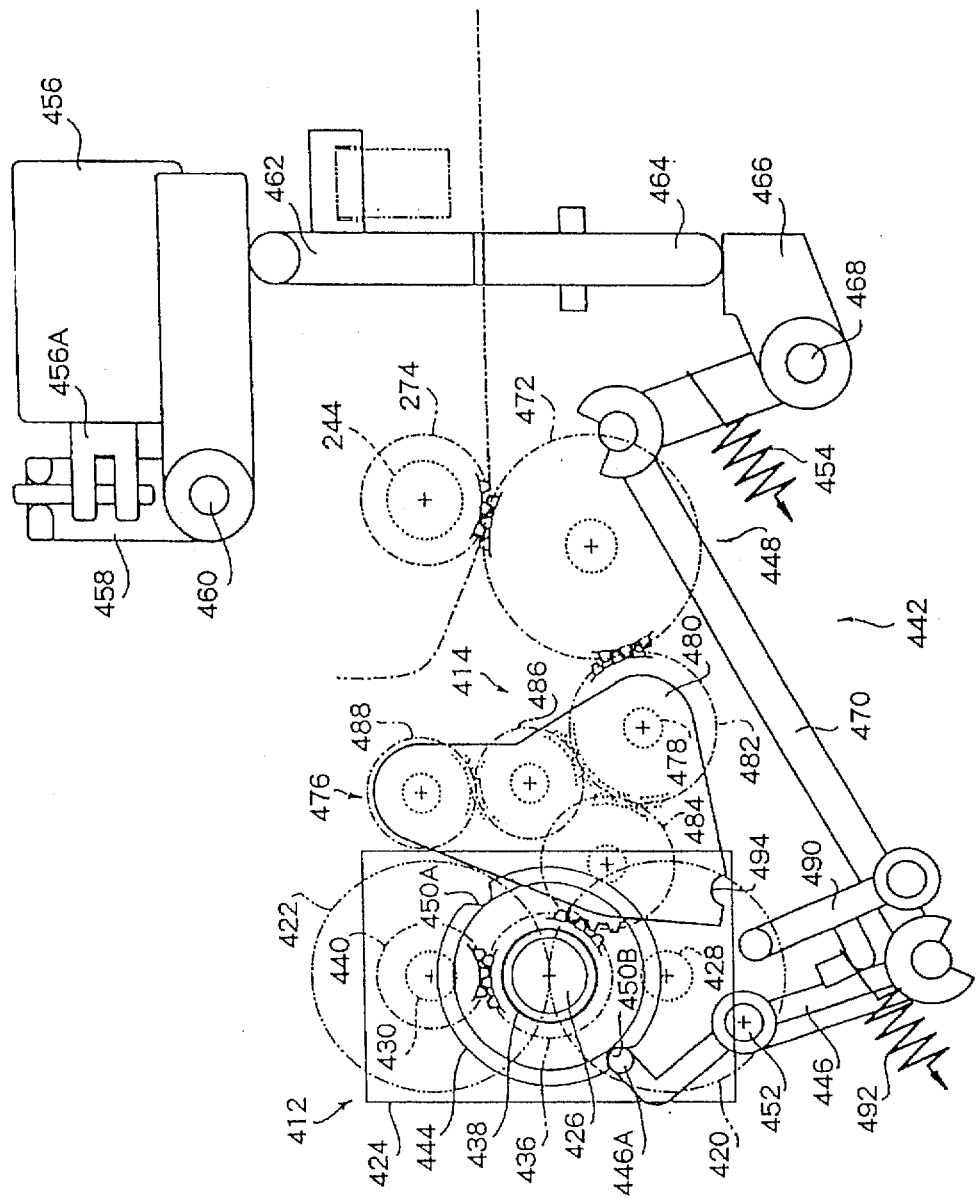
FIG. 17 is a front view for showing structures, in a state of sequence 1, of a reversing mechanism and a third driving power transmitting mechanism in the automatic document reversing device.

The reversing unit 412, as shown in FIG. 17, includes the pair of the reversing rollers 420, 422 and a pair of reversing brackets 424 in front and rear sides (only one being shown) for rotatably supporting the reversing rollers 420, 422, and the pair of the reversing brackets 424 is integrally connected through a coupling member (not shown). At respective central portions of outer surfaces of both the reversing brackets 424, supporting shafts 426 (only one being shown) are integrally provided in a state where the supporting shafts 426 project outward, respectively, and the supporting shafts 426 are rotatably supported by the reversing housing 406. More specifically, the pair of the reversing brackets 424 is rotatably supported around central axes of the supporting shafts 426. Between the reversing brackets 424, a driven shaft 428 and a drive shaft 420 are positioned above and below the supporting shaft 426 in the drawing, and are rotatably supported, respectively. More specifically, the driven shaft 428 and the driving shaft 430 are arranged with the supporting shaft 426 at an intermediate point therebetween in a state where the both shafts 428 and 430 are separated by 180 degrees (i.e. separated in a diametral direction).

Here, on a periphery of the driven shaft 428, the first reversing roller 420 as a driven roller is coaxially fixed, and on a periphery of the driving shaft 430, the second reversing roller 422 as a transferring roller is coaxially fixed. And, diameters of the reversing rollers 420, 422 and an interval between both the shafts 428, 430 are respectively defined so that the first and second reversing rollers 420, 422 revolvingly contact with each other. Incidentally, respective revolvingly contact portions of the first reversing roller 420 and the second reversing roller 422 are defined to be positioned in the document reversing transferring path. More specifically, the document transferred from the scanner device 12 is transferred into the reversing unit receiving portion 410 through the document in-take port 416 and then brought to the revolvingly contact portion of the first and second reversing rollers 420, 422.

On a periphery of the supporting shaft 426, a driven gear 436 is coaxially provided through a friction clutch 438. Also, on a periphery of the driving shaft 430, a driving gear 440 is coaxially fixed, and engaged with the driven gear 436. To the driven gear 436, the driving power of the driving motor 222 provided to the scanner device 12 is transmitted through the third driving power transmitting mechanism 414, described later, to thereby rotate the driven gear 436.

Here, the friction clutch 438 is constructed such that in case rotation of the supporting shaft 426 is restricted, the driven gear 436 is allowed to relatively rotate around the supporting shaft 426; and in case the rotation of the supporting shaft 426 is released, the driven gear 436 and the supporting shaft 426 are united so that they are integrally rotated.

As a result, in the state where the rotation of the supporting shaft 426 is restricted, in case the driving power of the driving motor 222 is transmitted to the driven gear 436 through the third driving power transmitting mechanism 414, only the driven gear 436 is rotated, so that the second reversing roller 422 and the first reversing roller 420 revolvingly contacting therewith are rotated (i.e., rotating on their own axes) around the respective central axes of the shafts 430 and 428. On the one hand, in the state where the rotation restriction of the supporting shaft 426 is released, in case the driving power of the driving motor 222 is transmitted to the driven gear 436 through the third driving power transmitting mechanism 414, the supporting shaft 426 together with the driven gear 436 are integrally rotated. As a result, the reversing brackets 424 are rotated, so that the first and second reversing rollers 420, 422 are revolved (i.e. revolving around the common axis) around the central axis of the supporting shaft 426 (in other words, around the intermediate point between the rollers 420, 422 as a center).

Next, a rotation control mechanism 442 for controlling a rotation state of the supporting shaft 426 is explained.

The rotation control mechanism 442 mainly includes a rotation control disc 444 fixed to the periphery of the supporting shaft 426; a rotation control lever 446 swingably provided so that the rotation control lever 446 is detachably engaged with the rotation control disc 444; and a swinging mechanism 448 for swinging the rotation control lever 446.

On a periphery of the rotation control disc 444, a pair of engaging recesses 450A, 450B is formed in a state that the recesses 450A, 450B are separated from each other in a diametral direction. While described later in detail, in case an engaging portion 446A formed on an edge (an upper portion in the drawing) of the rotation control lever 446 fits into one of the engaging recesses 450A, 450B, the rotation of the supporting shaft 426 is restricted (i.e., prohibited); and in case the engaging portion 446A does not fit into any of the engaging recesses 450A, 450B, the restriction of the rotation of the supporting shaft 426 is released (in other words, the rotation is allowed).

Here, the rotation control lever 446 is rotatably supported by the reversing housing 406 through a supporting shaft 452 at an intermediate point thereof, and indirectly receives an energizing power of a first coil spring 454, which is described later, to thereby receive a rotational energizing power to rotate around the supporting shaft 452 in a clockwise direction. In other words, the rotation control lever 446 is always urged to rotate in a direction where the engaging portion 446A is engaged with the periphery of the rotation control disc 444.

The swinging mechanism 448 has an electromagnetic solenoid 456 as a driving power source in the scanner housing 200. The electromagnetic solenoid 456 is organized to inwardly withdraw an actuator 456A by magnetizing. Incidentally, the electromagnetic solenoid 456 is electrically connected to a control unit (not shown) provided with a control circuit incorporated into the circuit substrate 206, and is controlled by the control unit in its magnetization and demagnetization.

To a forward edge (a left edge in the drawing) of the actuator 456A, an edge (an upper edge in the drawing) of a first coupling lever 458 is coupled. The first coupling lever 458 is formed in an approximately L-shape, and is rotatably supported to the scanner housing 200 at a bent portion thereof through a supporting shaft 460. Another edge (a right edge in the drawing) of the first coupling lever 458 is coupled to an upper edge of a second coupling lever 462, and the second coupling lever 462 is provided to the scanner housing 200 so that the coupling lever 462 slides in a vertical direction in the drawing. Also, a lower edge of the second coupling lever 462 is slightly projected downward from a lower surface of the scanner housing 200 and terminated.

Also, the swinging mechanism 448 has, in the reversing housing 406, a third coupling lever 464 having an upper edge to be coupled to the lower edge of the second coupling lever 462 under the condition that the scanner device 12 is placed on the stand 408. The third coupling lever 464 is provided to the reversing housing 406 to slide in a vertical direction in the drawing. A lower edge of the third coupling lever 464 is coupled to an edge (a right edge in the drawing) of a fourth coupling lever 466 formed in an approximately L-shape. The fourth coupling lever 466 is rotatably supported at a bent portion thereof by the reversing housing 406 through a supporting shaft 468. And another edge (an upper edge in the drawing) of the fourth coupling lever 466 and another edge (a lower edge in the drawing) of the rotation control lever 446 are coupled to each other with a fifth linear coupling lever 470. Incidentally, the fourth coupling lever 466 is coupled to the first coil spring 454, and directly receives the rotational energizing power from the first coil spring 454 such that the fourth coupling lever 466 rotates around the supporting shaft 468 in a counter-clockwise direction in the drawing.

Figure 18:
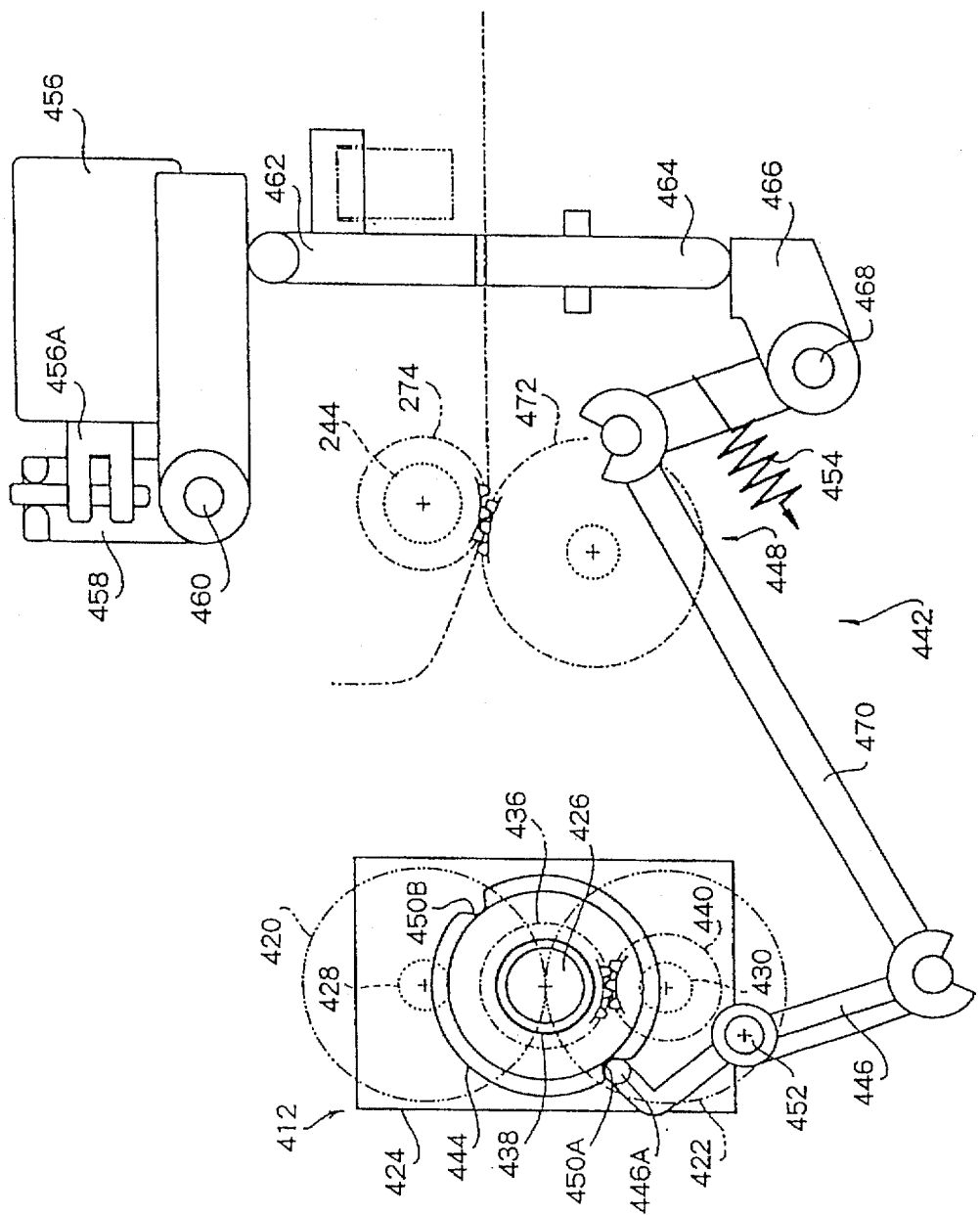
FIG. 18 is a front view for showing the reversing mechanism taken out from the automatic document reversing device shown in FIG. 17, in a state where rotation of reversing brackets is restricted.

Since the rotation control mechanism 442 is constructed as described above, under a condition that the electromagnetic solenoid 456 is demagnetized based on a control operation of the control unit, the engaging portion 446A formed on the one edge of the rotation control lever 446 is rotated by the energizing power of the first coil spring 454 in the direction where the engaging portion 446A is engaged with the periphery of the rotation control disc 444. Then, as shown in FIG. 18, in a state where the engaging portion 446A fits into the engaging recess 450A, rotation of the rotation control disc 444 (accordingly, the rotation of the supporting shaft 426) is restricted (i.e. prohibited).

Under this condition, when the driving power of the driving motor 222 is transmitted to the driven gear 436 through the third driving power transmitting mechanism 414 described later, the driving gear 440 to be engaged with the driven gear 436 is rotated, so that the second reversing roller 422 adapted to integrally rotate together with the driving gear 440 is rotated around its own central axis (i.e., rotating on its own axis). Also, the first reversing roller 420 revolvingly contacting with the second reversing roller 422 is rotated together with the second reversing roller 422 in accordance with rotation of the second reversing roller 422.

Figure 19:
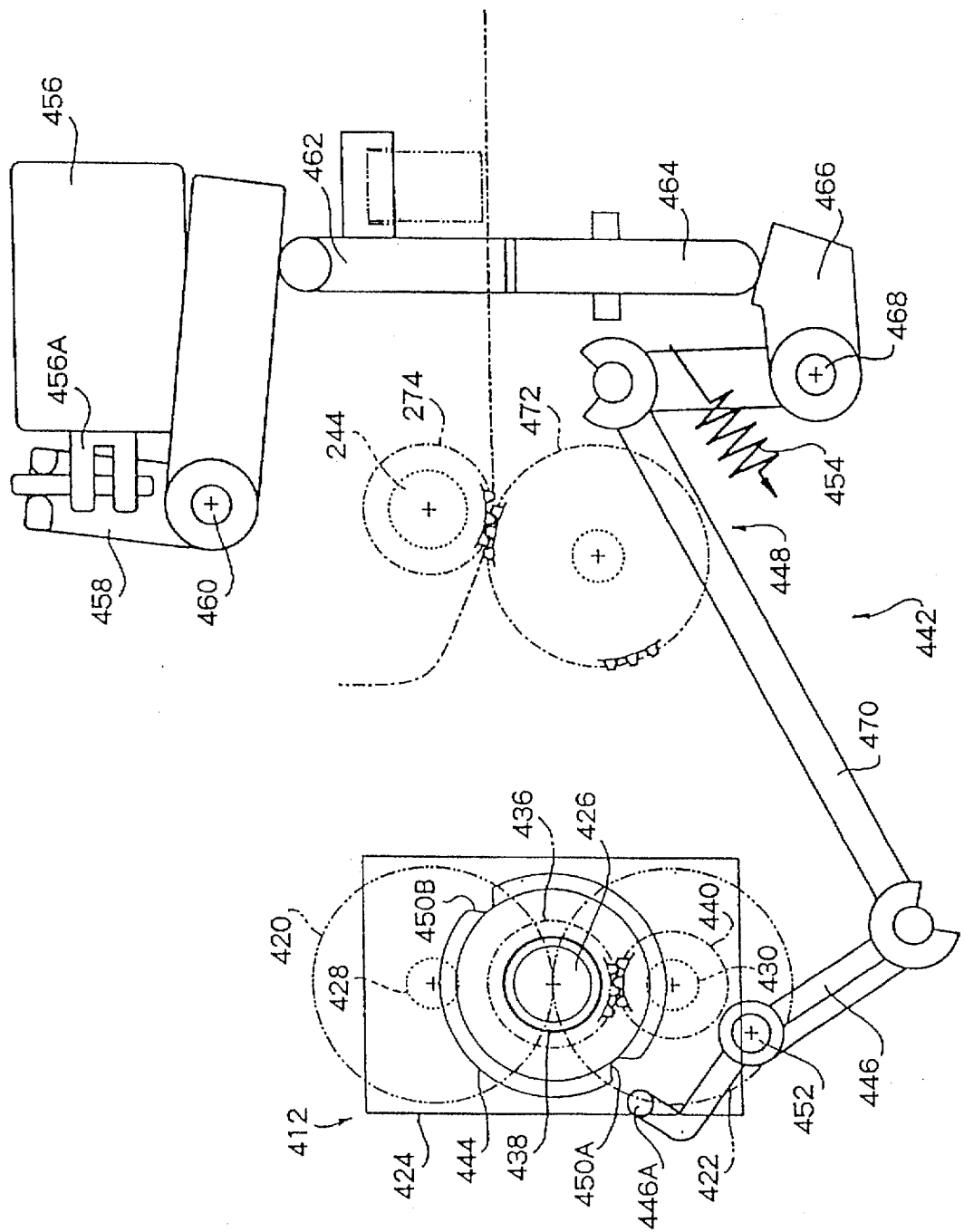
FIG. 19 is a front view for showing the reversing mechanism in a state where the rotation of the reversing brackets is allowed from the state shown in FIG. 18.

In the rotation restriction state of the rotation control disc 444, when the electromagnetic solenoid 456 is magnetized based on a control operation of the control unit, as shown in FIG. 19, the engaging portion 446A of the rotation control lever 446 is taken out outward in a radial direction from the engaging recess 450A engaged therewith against the energizing power of the first coil spring 454. As a result, the rotation restriction of the supporting shaft 426 is released, and the supporting shaft 426 is allowed to rotate.

Figure 20:
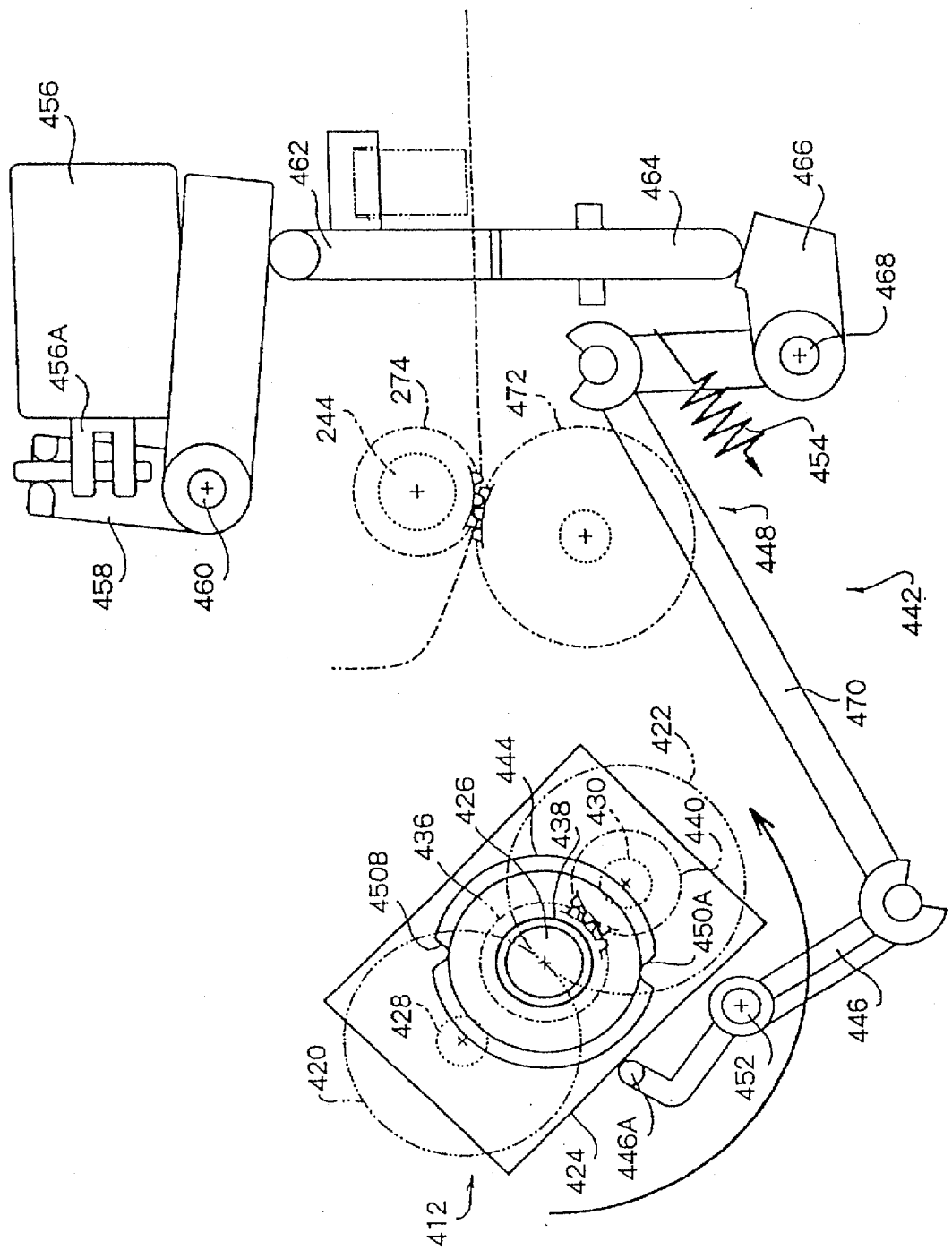
FIG. 20 is a front view for showing the reversing mechanism in a state where the reversing brackets are rotated from the state shown in FIG. 19.

Under this condition, when the driving power of the driving motor 222 is transmitted to the driven gear 436 through the third driving power transmitting mechanism 414, the supporting shaft 426 is integrally rotated together with the driven gear 436, and as shown in FIG. 20, the reversing brackets 424 to which the supporting shaft 426 is integrally provided are rotated around the central axis of the supporting shaft 426 (i.e., revolving around the common axis).

Figure 21:
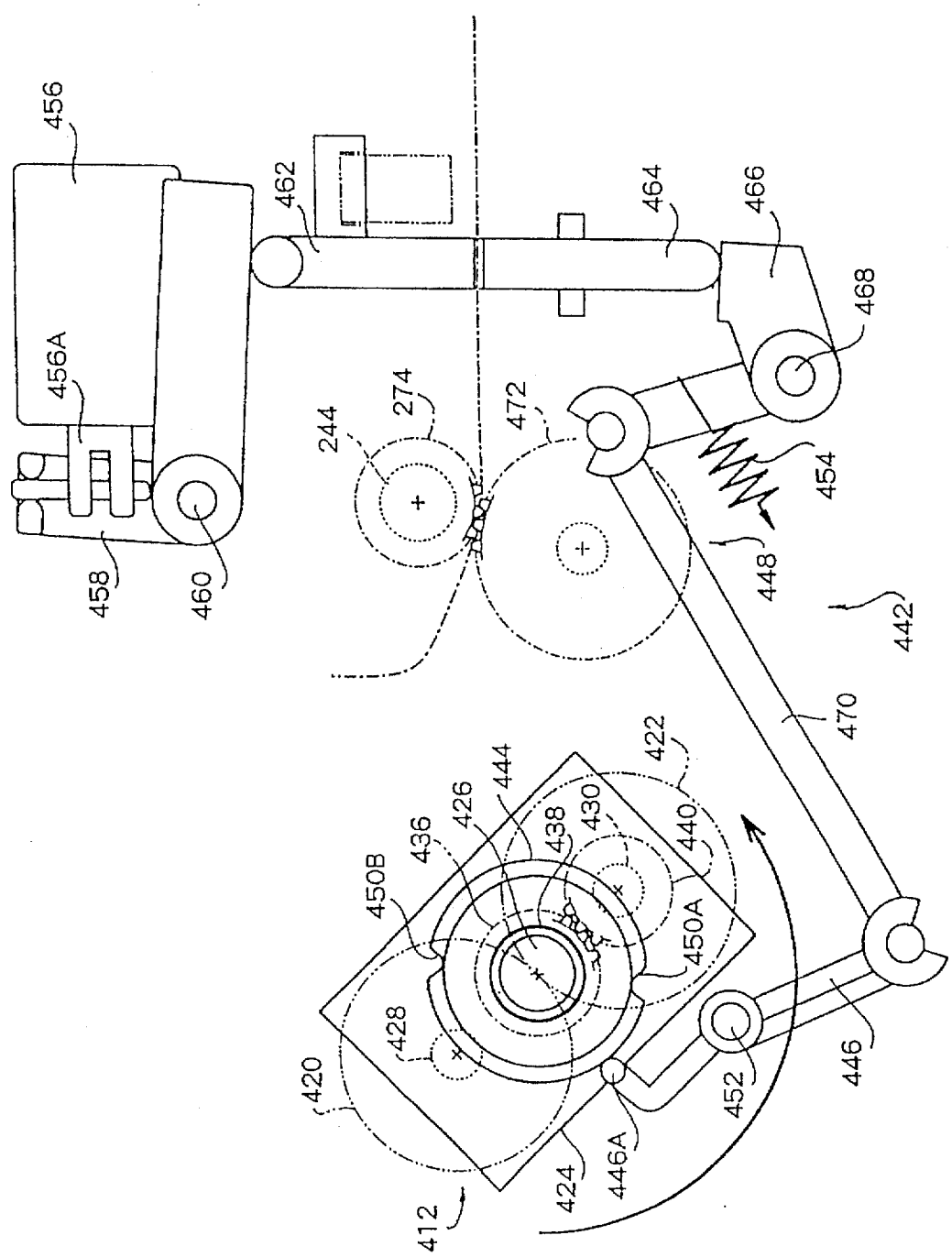
FIG. 21 is a front view for showing the reversing mechanism in a state where an engaging portion resiliently abuts against a periphery of a rotation control disc in the middle of the rotation of the reversing brackets from the state shown in FIG. 20.

Immediately after the reversing bracket 424 start the revolving operation, when the electromagnetic solenoid 456 is demagnetized based on the control operation of the control unit, by the energizing power of the first coil spring 454, the engaging portion 446A formed on the one edge of the rotation control lever 446 is urged to rotate in the direction where the engaging portion 446A engages with the periphery of the rotation control disc 444. As a result, the engaging portion 446A, as shown in FIG. 21, resiliently abuts against the periphery of the rotation control disc 444. Under this condition, since the engaging portion 446A does not fit into any of the engaging recesses 450A, 450B, the rotation of the rotation control disc 444 is not restricted so that the rotation control disc 444 keeps rotating in accordance with the rotation of the supporting shaft 426.

Figure 22:
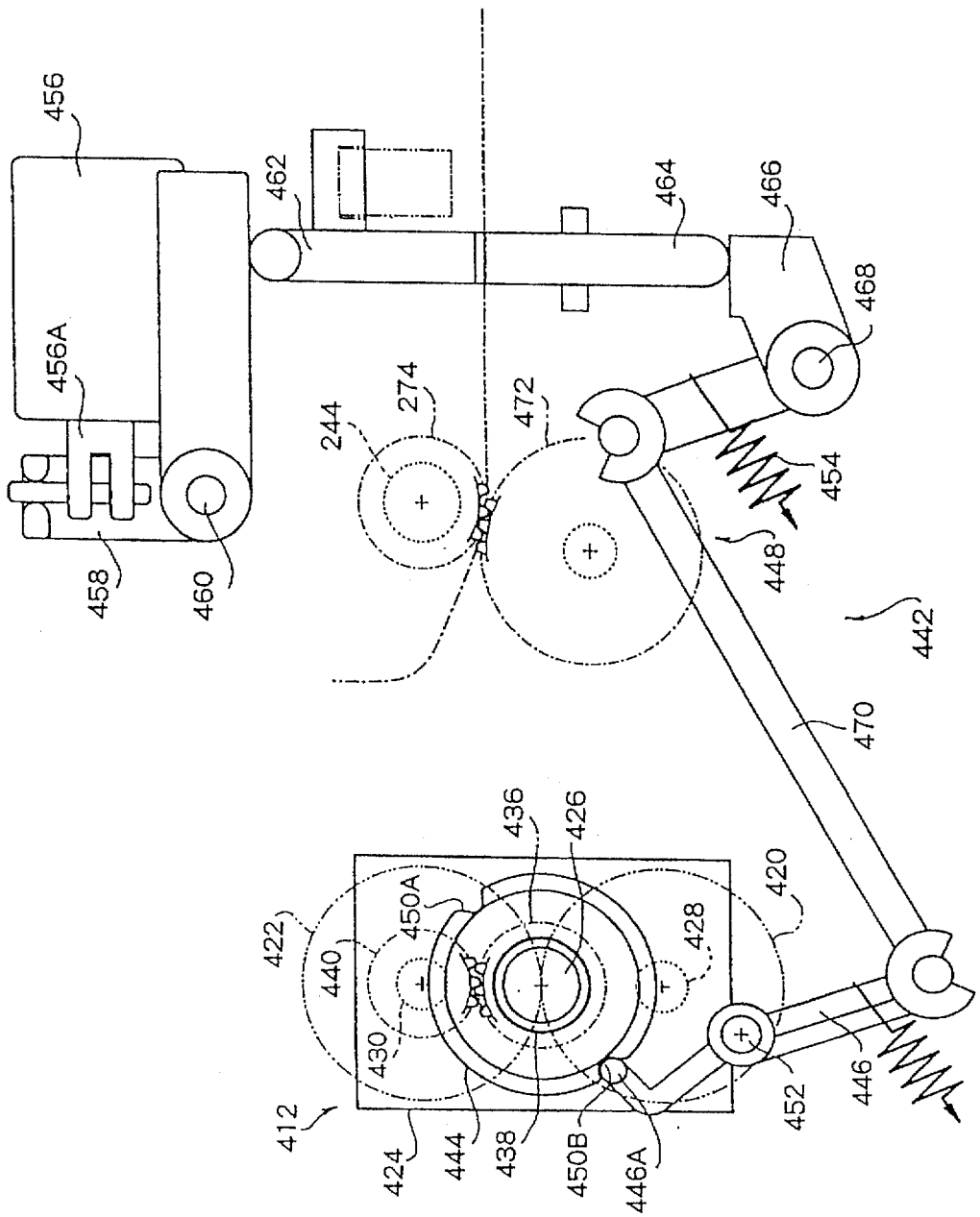
FIG. 22 is a front view for showing the reversing mechanism in a state where the reversing brackets are rotated by 180 degrees from the states shown in FIGS. 18 and 19 from the state shown in FIG. 21.

However, by the rotation of the rotation control disc 444, when the engaging portion 446A faces the other engaging recess 450B, as shown in FIG. 22, the engaging portion 446A is fitted into the engaging recess 450B by the energizing power of the first coil spring 454, so that rotation of the rotation control disc 444 (accordingly, the rotation of the supporting shaft 426) is restricted (i.e., prohibited). As described above, the revolving operation by the reversing bracket 424 is terminated at a state where the reversing bracket 424 rotates by 180 degrees which is a separation angle between the two engaging recesses 450A, 450B.

A structure of the third driving power transmitting mechanism 414 for reversibly transmitting the driving power of the driving motor 222 provided in the scanner device 12 to the reversing unit 412 is described in detail referring to FIG. 17 and FIGS. 23 through 26.

The third driving power transmitting mechanism 414, as shown in FIG. 17 again, includes a first coupling gear 472 rotatably supported with the reversing housing 406, and an upper portion of the first coupling gear 472 is exposed from the upper surface of the stand 408. Under the condition that the scanner device 12 is placed on the stand 408, the first coupling gear 472 is engaged with a first driving power take-out gear 274 coaxially fixed to the second driven shaft 244. More specifically, under the condition that the scanner device 12 is placed on the stand 408 of the automatic document reversing device 14, the driving power of the driving motor 222 is transmitted to the first coupling gear 472 through the first driving power take-out gear 274 with which the gear 472 is engaged.

Between the first coupling gear 472 and the driven gear 436 of the reversing unit 412, a planetary gear unit 476 for reversibly shifting a rotating direction of a rotation driving power transmitted to the driven gear 436 is mounted.

The planetary gear unit 476 includes a pair of swinging brackets 480 in front and rear sides (only one being shown) rotatably supported around the supporting shaft 478 by the reversing housing 406; a sun gear 482 rotatably supported by the supporting shaft 478 and at the same time frictionally engaged with the swinging brackets 480 through a friction engagement member (not shown); a first planetary gear 484 positioned on a left side of the sun gear 482 in the drawing, rotatably supported by the swinging brackets 480, and engaged with the sun gear 482; an intermediate gear 486 positioned on an upper side of the sun gear 482 in the drawing, rotatably supported by the swinging brackets 480, and engaged with the sun gear 482; and a second planetary gear 488 positioned on an upper side of the intermediate gear 486 in the drawing, rotatably supported by the swinging brackets 480, and engaged with the intermediate gear 486.

Here, positions supported by shafts of the first and second planetary gears 484 and 488 (i.e., distances spaced from the supporting shaft 478) are defined such that the first planetary gear 484 and the second planetary gear 488 are alternatively engaged with the driven gear 436 of the reversing unit 412 in accordance with swing of the swinging brackets 480. More specifically, the swinging brackets 480 are swingable between a first swing position where the first swinging gear 484 intermeshes with the driven gear 436 and a second swing position where the second planetary gear 488 intermeshes with the driven gear 436, and at the same time is swingable up to a lifting position slightly deviated from the first swing position in the clockwise direction in the drawing. In other words, the swinging brackets 480 are set such that by being swung in the clockwise direction in the drawing from the first swing position, the swinging brackets 480 abut against a stopper (now shown), and are regulated to be at the lifting position.

Incidentally, under a condition that the swinging brackets 480 are regulated at the first swing position, the driven gear 436 is rotated in the same direction as a rotating direction of the first driving power take-out gear 274 (i.e., in a direction opposite to a rotating direction of the first coupling gear 472) and under a condition that the swinging brackets 480 are regulated at the second swing position, the driven gear 436 is rotated in a direction opposite to the rotating direction of the first driving power take-out gear 274 (i.e., in the same direction as the rotating direction of the first coupling gear 472).

The third driving power transmitting mechanism 414 is disposed adjacent to the rotation control lever 446 on the right side thereof in the drawing in order to control the swinging position of the swinging brackets 480, and rotatably supported by the reversing housing 406 at a lower edge thereof in the drawing. At the same time, the third driving power transmitting mechanism 414 includes a swing control lever 490 detachably engaged with the swinging bracket 480 at an upper end thereof in the drawing, and a second coil spring 492 for allowing the swing control lever 490 to always resiliently abut against the rotation control lever 446 by urging the swing control lever 490 to rotate in the counter-clockwise direction in the drawing. More specifically, the swing control lever 490 is supported to be swingable between a locking position for locking the swinging brackets 480 at the first swing position and a retreating position for allowing the swinging brackets 480 to swing from the first swing position toward the second swing position. Incidentally, the swinging bracket 480 is provided, at a lower surface thereof, with a locking recess 494 in which the upper end of the swing control lever 490 is fitted under the condition that the swing control lever 490 is locked.

More specifically, under the condition that the swing control lever 490 is fitted in the locking recess 494 (in other words, the swing control lever 490 is positioned at the locking position), the swinging brackets 480 are locked at the first swing position. Also, when the swinging brackets 480 are brought to the lifting position from the locked state, the condition of the swinging brackets 480 locked at the first swing position is released. Also, although the swing control lever 490 released from the locked condition is swung to the counter-clockwise direction in the drawing by an urging force of the second coil spring 492, a releasing position of the control lever 490 is defined by abutting against the rotation control lever 446.

Here, under a condition that the swing control lever 490, as shown in FIG. 17, is rotated to a position where the electromagnetic solenoid 456 is demagnetized and the rotation control lever 446 is fitted into one of the engaging recesses 450A, 450B of the rotation control disc 444, the upper end of the swing control lever 490 is swung to the releasing position where the upper end thereof is released from the swinging bracket 480; and under a condition that the swing control lever 490 is rotated to a position where the electromagnetic solenoid 456 is magnetized and the rotation control lever 446 is released from the rotation control disc 444, the upper end of the swing control lever 490 is swung to the locking position to be able to engage with the lower surface of the swinging bracket 480.

Figure 23:
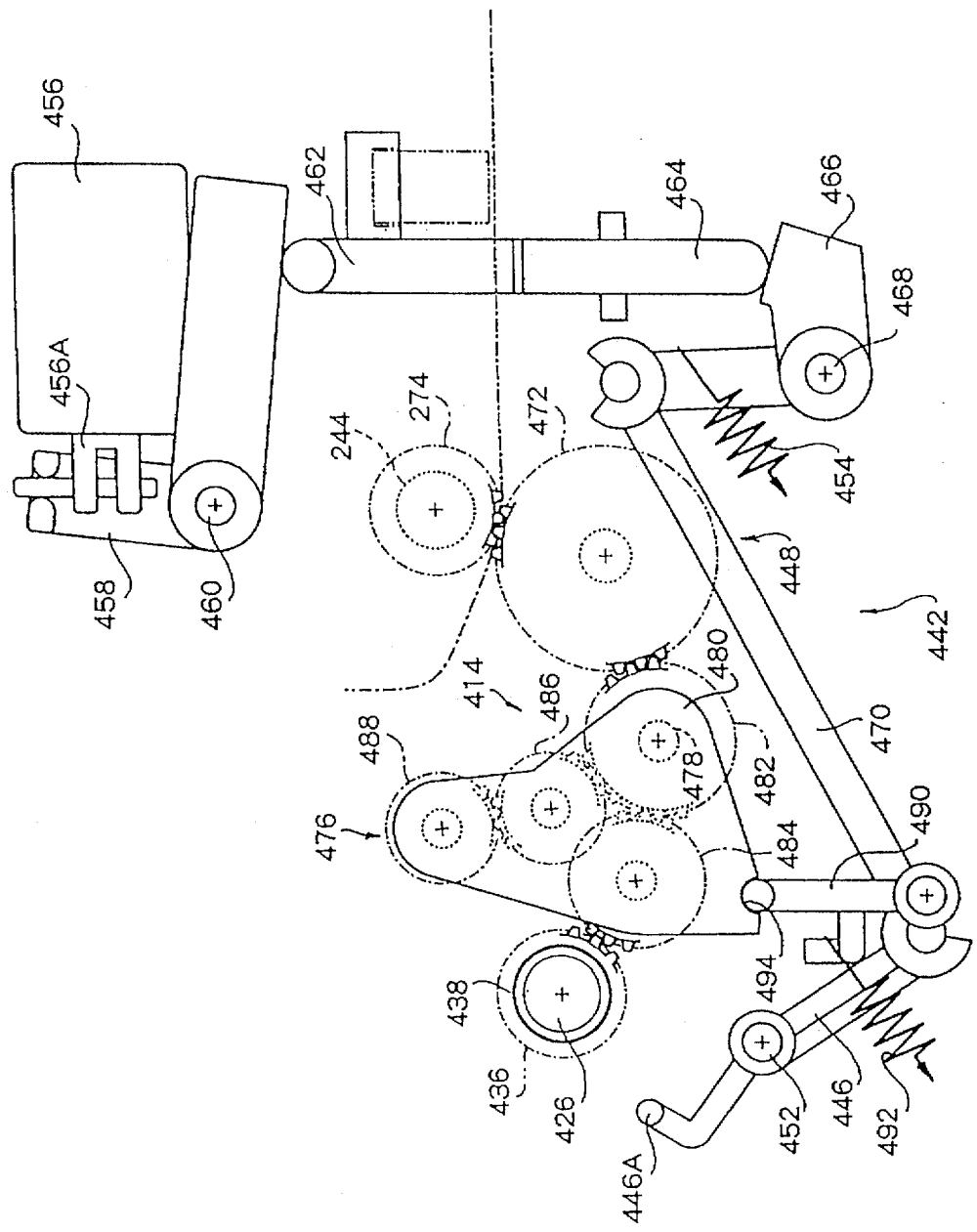
FIG. 23 is a front view for showing the third driving power transmitting mechanism taken out from the automatic document reversing device shown in FIG. 17, in a state where swinging brackets are locked in a first swing position and an electromagnetic solenoid is magnetized.

First, as shown in FIG. 23, under the condition that the electromagnetic solenoid 456 is magnetized and the upper end of the swing control lever 490 is fitted into the locking recess 494 of the swinging bracket 480, the swinging brackets 480 are locked at the first swing position and the first planetary gear 484 intermeshes with the driven gear 436. As a result, the driven gear 436 is rotated in the same direction as that of the first driving power take-out gear 274.

From the condition shown in FIG. 23, when the driving motor 222 rotates the motor shaft 222A in the counter-clockwise direction in the drawing so that the first driving power take-out gear 274 is rotated in the clockwise direction in the drawing, in association with the rotation, the sun gear 482 is also rotated in the clockwise direction in the drawing; and in association therewith, the planetary gear unit 476 is as a whole rotated in the clockwise direction in the drawing around the supporting shaft 478 as a center to thereby be brought to the lifting position as described above. As a result, as shown in FIG. 24, the locking recess 494 is lifted with respect to the swing control lever 490, so that the swing control lever 490 is allowed to rotate.

Thereafter, when the electromagnetic solenoid 456 is demagnetized, the rotation control lever 446 is rotated in the clockwise direction in the drawing around the supporting shaft 452 as a center by the energizing power of the first coil spring 454. Corresponding to the rotation, the swing control lever 490 resiliently abutting against the rotation control lever 446 is also rotated in the counter-clockwise direction in the drawing around a lower end thereof as a center by the urging force of the second coil spring 492. By this rotation, as shown in FIG. 25, the upper end of the swing control lever 490 is rotated to a position outside a moving area of the swinging brackets 480, so that the planetary gear unit 476 can be swung from the first swing position to the second swing position.

Figure 25:
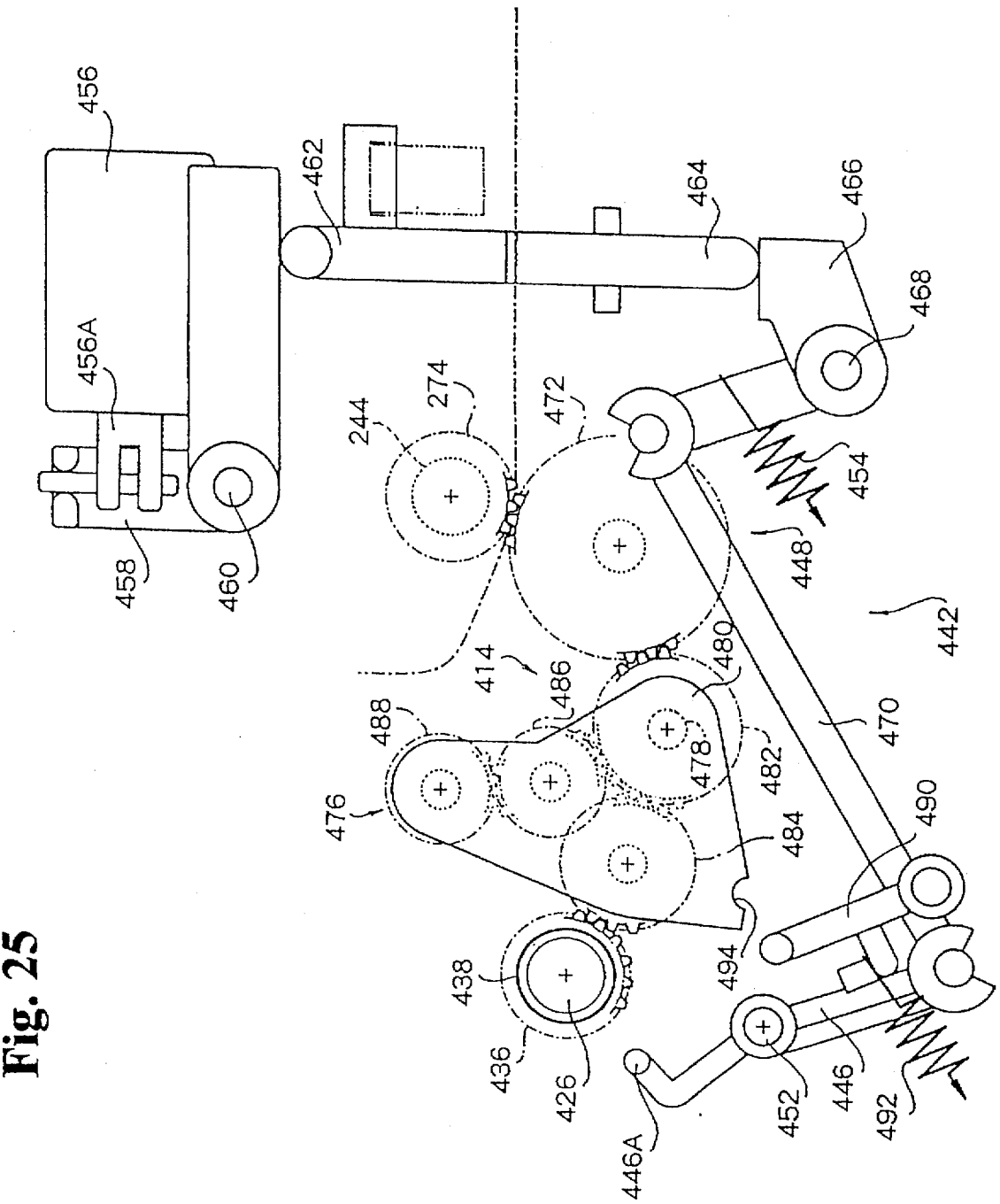
FIG. 25 is a front view for showing a state where the electromagnetic solenoid is demagnetized from the state shown in FIG. 24.
Figure 26:
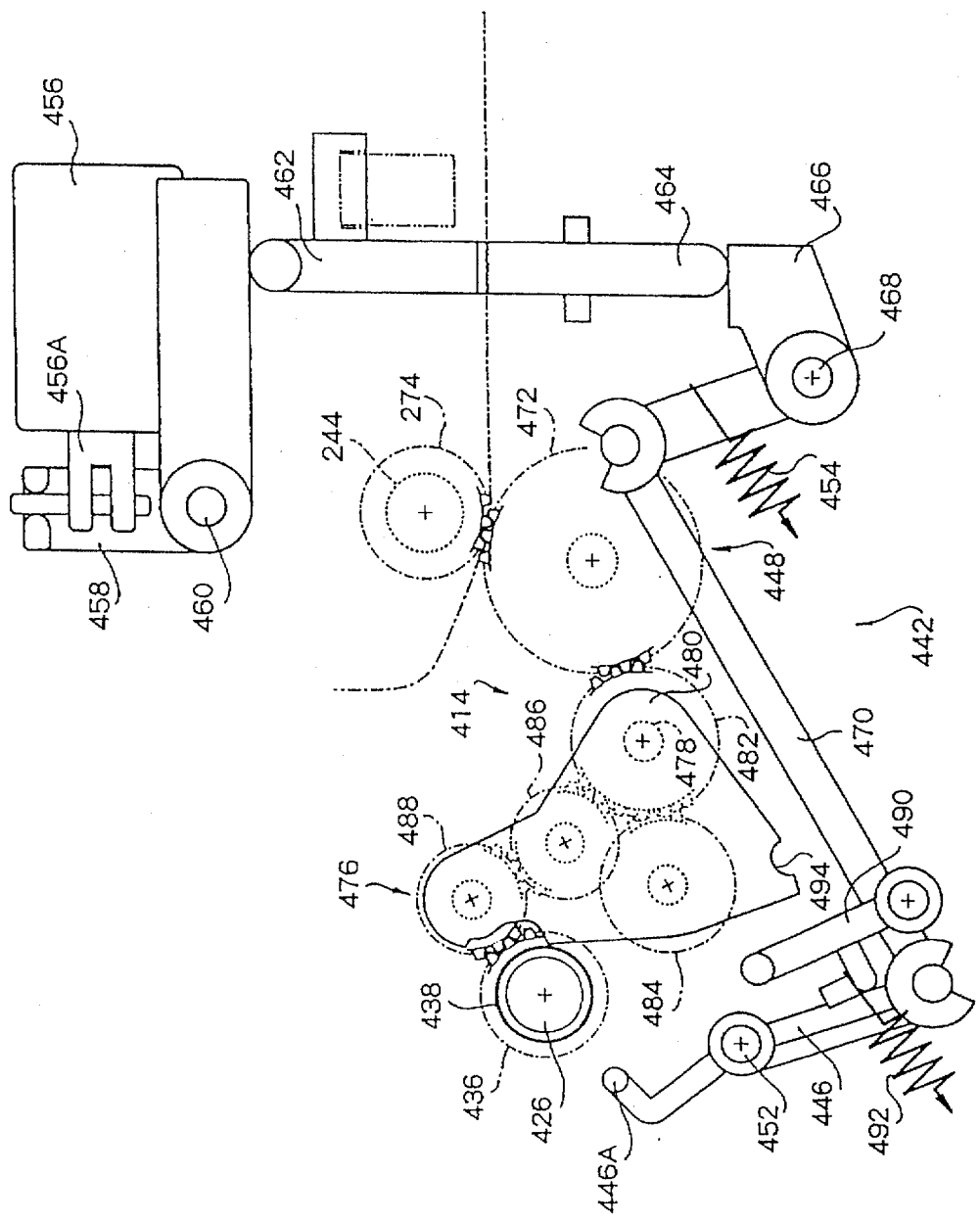
FIG. 26 is a front view for showing a state where the swinging brackets are swung to a second swing position from the state shown in FIG. 25.

Then, from the condition shown in FIG. 25, this time, when the driving motor 222 rotates the motor shaft 222A in the clockwise direction in the drawing, the first driving power take-out gear 274 is rotated in the counter-clockwise direction in the drawing; in accordance with the rotation, the sun gear 482 is also rotated in the counter-clockwise direction in the drawing; and corresponding to this rotation, the planetary gear unit 476 is also as a whole rotated around the supporting shaft 478 as the center in the counterclockwise direction in the drawing. According to the rotation, as shown in FIG. 26, the planetary gear unit 476 abuts against the stopper (not shown) to thereby be brought to the second swing position. As a result, the second planetary gear 488 intermeshes with the driven gear 436, and the driven gear 436 is rotated in a direction opposite to the rotating direction of the first driving power take-out gear 274.

Figure 24:
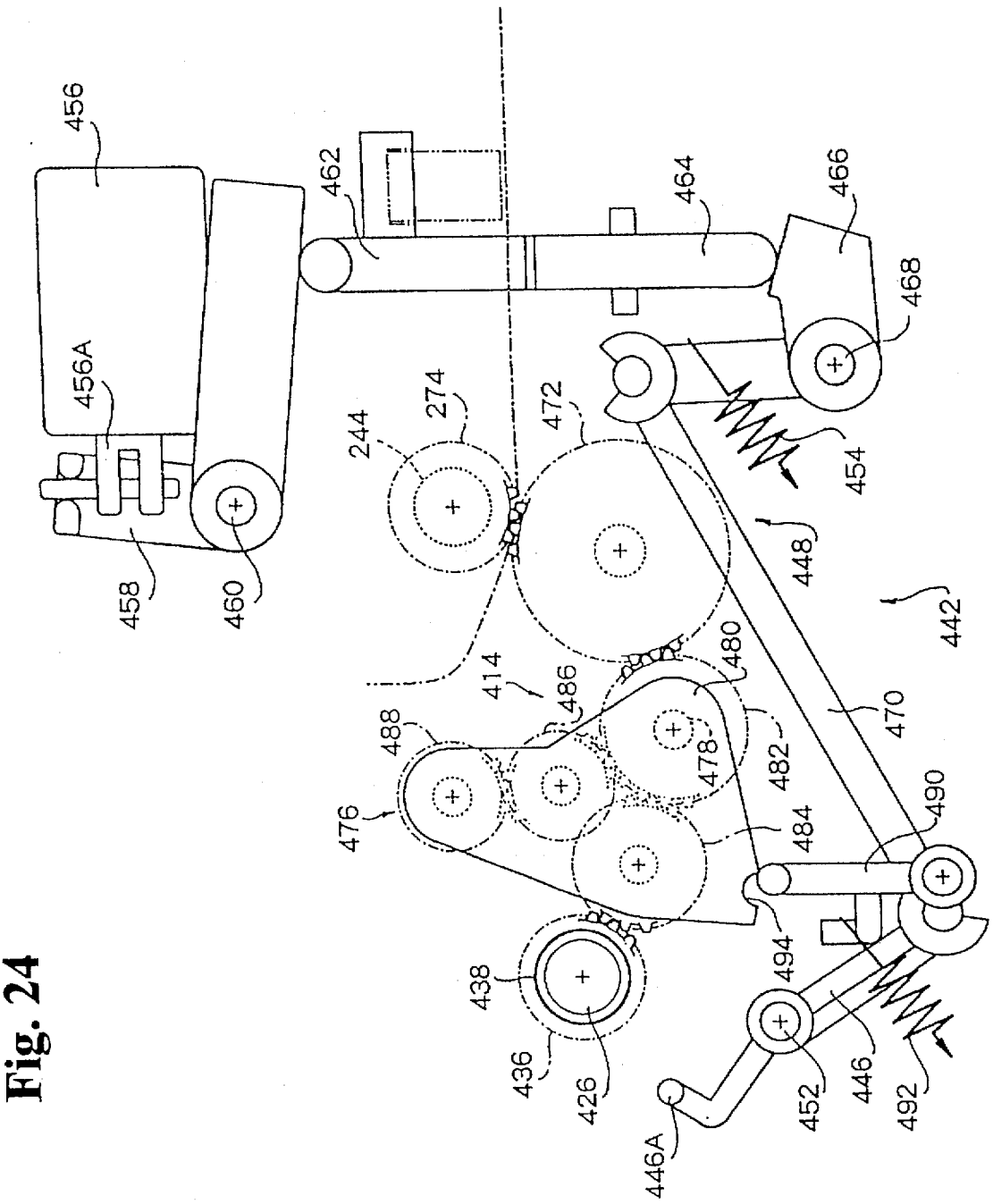
FIG. 24 is a front view for showing a state where the swinging brackets are swung to a lifting position from the state shown in FIG. 23.

Also, as shown in FIG. 26, when the above described operation procedure is reversely carried out from a state where the planetary gear unit 476 is positioned in the second swing position, in other words, when the planetary gear unit 476 is operated sequentially as shown by FIG. 26, FIG. 25, FIG. 24, and then FIG. 23, the planetary gear unit 476 is returned to the first swing position as shown in FIG. 23.

Since the third driving power transmitting mechanism 414 is organized as described above, although the automatic document reversing device 14 itself is not provided with a driving source, when the automatic document reversing device 14 is attached to the scanner device 12, the first coupling gear 472 is engaged with the first driving power take-out gear 274 disposed on the side of the scanner device 12. Through the engagement of the first coupling gear 472 and the first driving power take-out gear 274, a driving gear 614 can receive the driving power from the driving motor 222, as the driving source, built in the scanner device 12 sequentially through the first and fourth driving power transmitting mechanisms 228, 606 to thereby rotate the driven gear 436.

Hereinunder, referring to FIG. 17, FIGS. 27 through 37 and Table 1, the reversing operation of a document in the automatic document reversing device 14 is described in detail.

TABLE 1

| Sequence | Scanner condition | First driving power take-out gear | Reversing roller | Reversing unit | Solenoid | Planetary gear unit | Motor movement |
|---|---|---|---|---|---|---|---|
| 1 | Initialization of reversing unit and planetary gear unit | CW | CCW | Stop or rotate | OFF | | CCW16STEP |
| 2 | | CW | CCW | Stop | ON | | |
| 3 | | CCW | — | Rotate | ON | | CW454STEP |
| 4 | | CCW | — | Rotate | OFF | | |
| 5 | Normal reading | CW | CCW | Stop | OFF | | CCW2883STEP |
| 6 | Rotation of reversing bracket | CCW | — | Rotate | ON | | CW8STEP |
| 7 | | CCW | — | Rotate | OFF | | CW454STEP |
| 8 | Leading edge of document is held by rollers | CCW | CW | Stop | OFF | | CW2178STEP |

TABLE 1-continued

| Sequence | Scanner condition | First driving power take-out gear | Reversing roller | Reversing unit | Solenoid | Planetary gear unit | Motor movement |
| --- | --- | --- | --- | --- | --- | --- | --- |
| 9 | Mode change | CW | CW | Stop | OFF | | CCW16STEP |
| 10 | Reverse reading | CCW | CW | Stop | OFF | | CW2883STEP |
| 11 | To return reversing unit & planetary gear unit to initial positions | CW | CCW | Stop | OFF | | CW16STEP |
| 12 | | CW | CCW | Stop | ON | | |
| 13 | | CCW | — | Rotate | ON | | CW454STEP |
| 14 | | CCW | — | Rotate | OFF | | |

First, referring to FIG. 17 and FIGS. 27 through 29, an initialization of the automatic document reversing device 14, i.e., initializing operations of the reversing unit 412 and the planetary gear unit 476 are described. In other words, when the automatic document reversing device 14 is started, in the reversing unit 412, it is not yet determined whether the reversing roller 422 as the transferring roller is positioned on an upper side or on a lower side, and in the third driving power transmitting mechanism 414, it is not yet determined whether the planetary gear unit 476 is positioned at the first swing position or the second swing position. Therefore, when the automatic document reversing device 14 is started, first, the initializing operations of the reversing unit 412 and the planetary gear unit 476 are carried out.

More specifically, when the automatic document reversing device 14 is started, as shown in FIG. 17, the control unit rotates the driving motor 222 in the counter-clockwise direction in the drawing by, for example, only 16 steps under the condition that the electromagnetic solenoid 456 is demagnetized. With this rotation, the planetary gear unit 476 is rotated in the clockwise direction in the drawing. As a result, the swinging brackets 480 are slightly lifted in the clockwise direction in the drawing from the first swing position or the second swing position, and then rotated to the lifting position as described above, so that the swing control lever 490 can be slipped into the lower side of the swinging bracket 480 (Sequence 1). Thus, when the initializing operation is started, irrespective of the first swing position or the second swing position of the swinging brackets 480, by carrying out Sequence 1, the swinging brackets 480 are positively brought to the lifting position.

Figure 27:
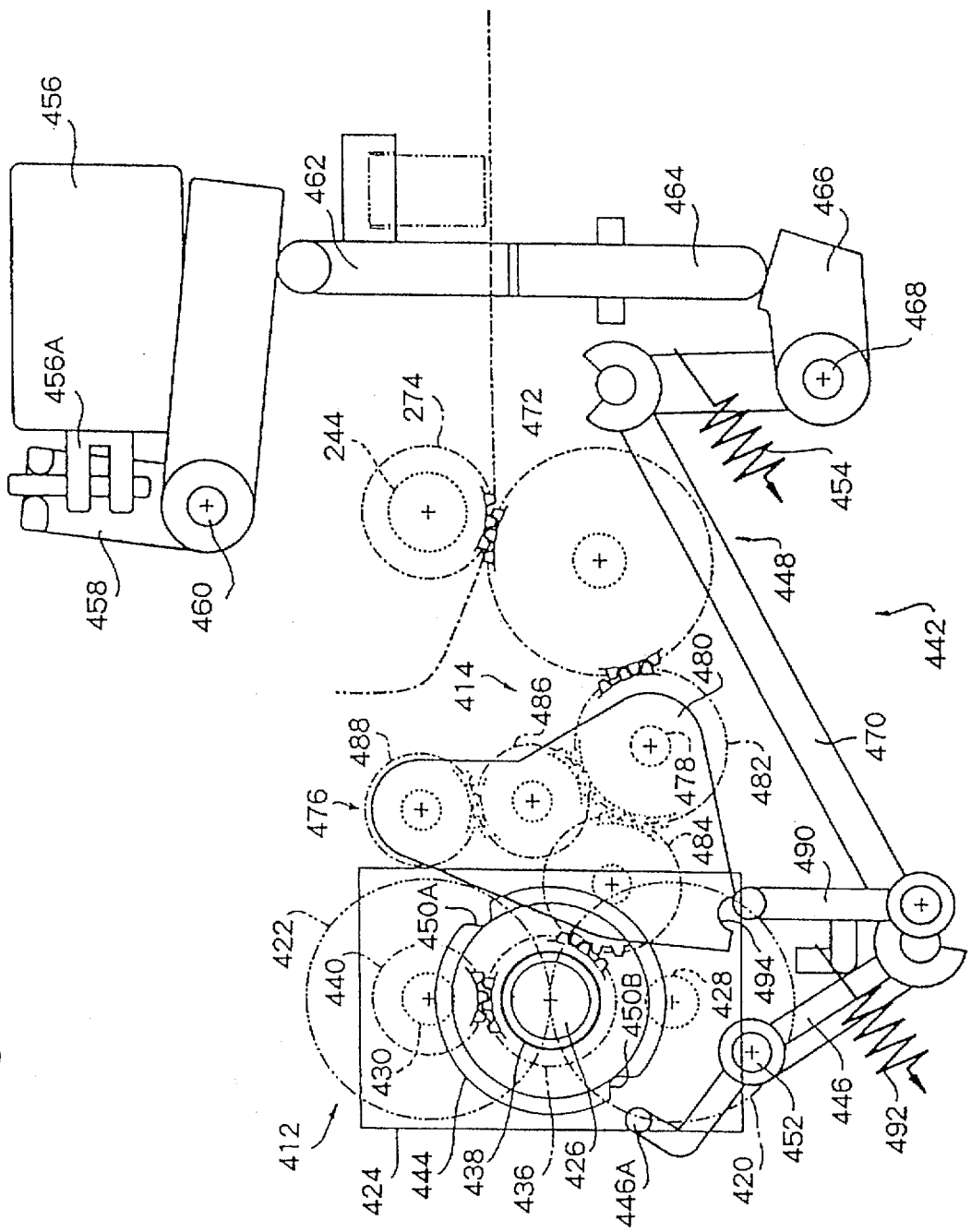
FIG. 27 is a front view for showing structures of the reversing mechanism and the third driving power transmitting mechanism in a state of sequence 2, i.e., in a state where the swinging brackets are swung to the lifting position from the state shown in FIG. 17.

Then, the control unit magnetizes the electromagnetic solenoid 456 during the rotating operation of the 16 steps. As a result, as shown in FIG. 27, the rotation control lever 446 is rotated in the counter-clockwise direction in the drawing against the energizing power of the first coil spring 454; the engaging portion 446A is released from the engaging recesses 450A, 450B; and at the same time the swing control lever 490 is pressed by the rotation control lever 446 to thereby rotate in the clockwise direction in the drawing against the urging force of the second coil spring 492. As a result, the upper end of the swing control lever 490 is brought to the condition that the upper end thereof is able to fit into the locking recess 494 (Sequence 2).

Figure 28:
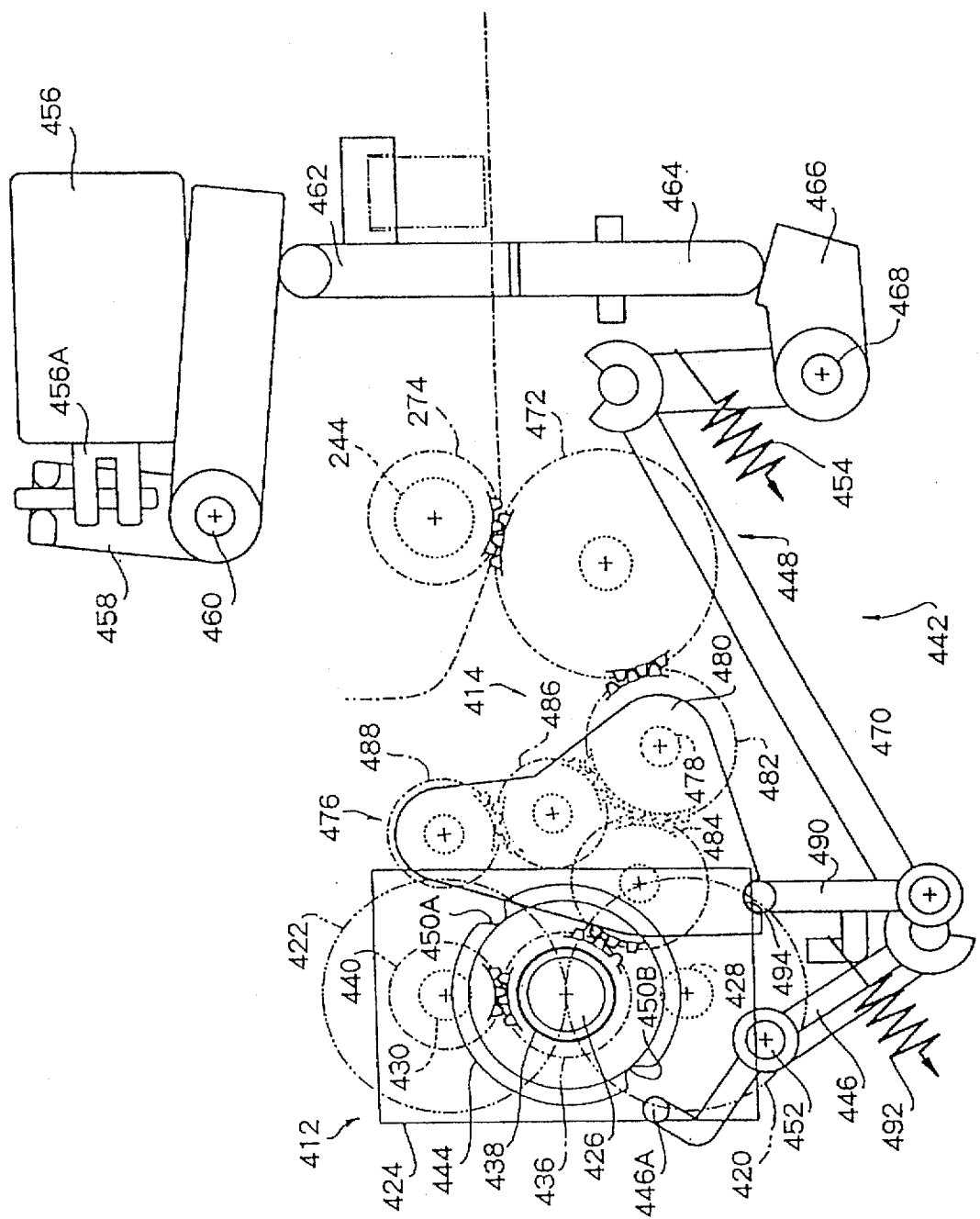
FIG. 28 is a front view for showing the structures of the reversing mechanism and the third driving power transmitting mechanism in a state of sequence 3, i.e., in a state where the swinging brackets are locked to the first swing position from the state shown in FIG. 27.

Thereafter, the control unit rotates the driving motor 222 in the clockwise direction in the drawing by, for example, only 454 steps under the condition that the electromagnetic solenoid 456 is kept magnetizing. By the rotation, as shown in FIG. 28, the swinging brackets 480 are swung in the counter-clockwise direction in the drawing and the upper end of the swing control lever 490 is fitted into the locking recess 494 of the swinging bracket 480, so that the swinging brackets 480 are locked in the first swing position and at the same time the reversing brackets 424 operate revolving. (Sequence 3).

Figure 29:
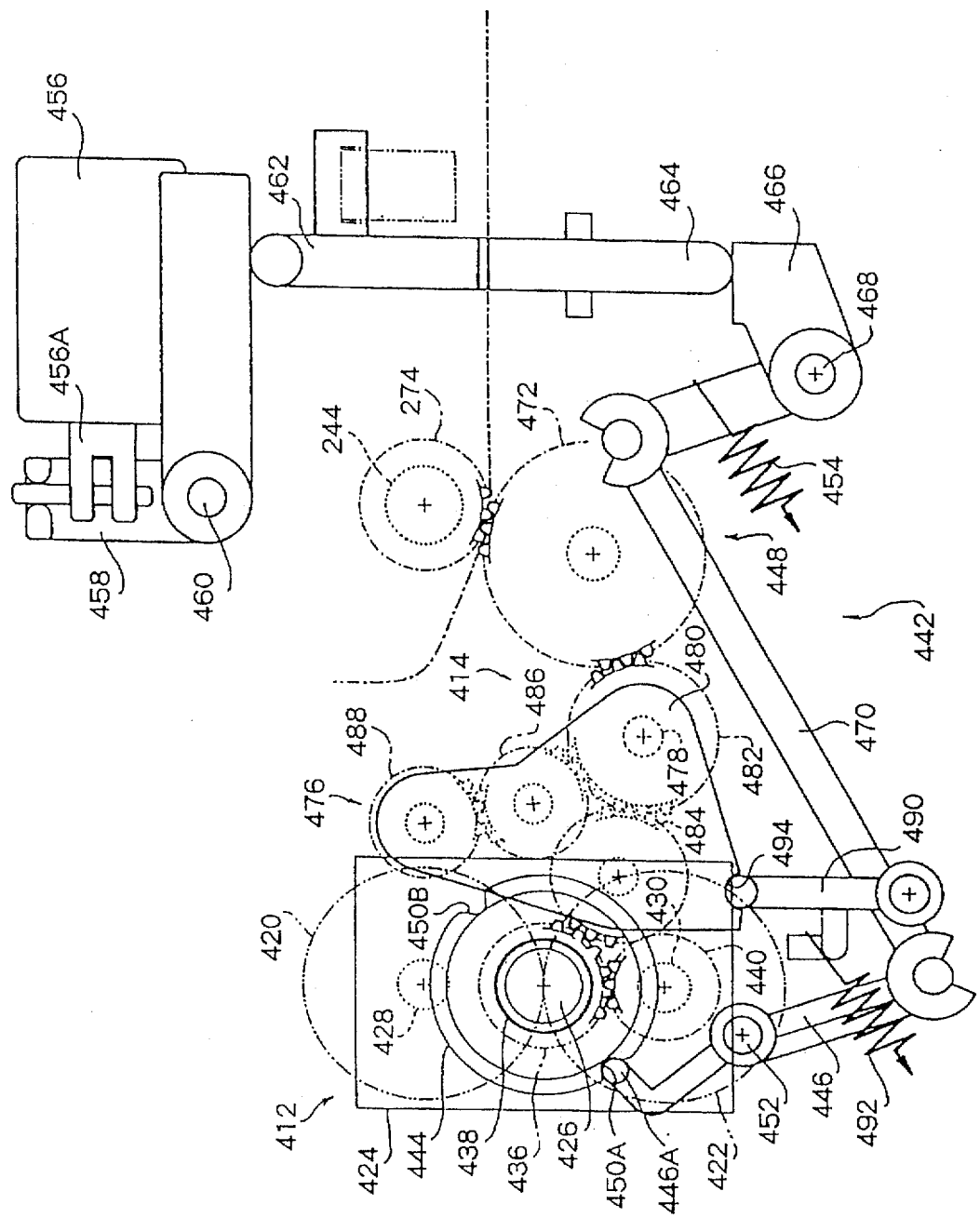
FIG. 29 is a front view for showing the structures of the reversing mechanism and the third driving power transmitting mechanism in a state of sequence 4, i.e., in a state where the rotation of the reversing brackets is restricted from the state shown in FIG. 28.

Then, the control unit demagnetizes the electromagnetic solenoid 456 during the rotating operation of the 454 steps. By the demagnetization, the engaging portion 446A of the rotation control lever 446 resiliently abuts against the periphery of the rotation control disc 444; in accordance with the revolving operation by the reversing brackets 424, as shown in FIG. 29, the engaging portion 446A is fitted into one of the engaging recesses 450A, 450B (Sequence 4). Then, in synchronism with the fitting operation, the driving operation of the driving motor 222 of the above described 454 steps is completed, and the revolving operation by the reversing brackets 424 is terminated.

When the revolving operation is terminated, the control unit checks a reversing sensor (not shown). At this point, the reversing sensor is constructed to be turned on when the reversing roller 422 as the transferring roller is positioned on the lower side, and turned off when the reversing roller 422 is positioned on places other than the lower side. As a result, since the control unit is determined that in case the reversing sensor is turned on, the reversing unit 412 is set at a predetermined position (i.e., the reversing roller 422 is positioned on the lower side), a series of initializing operations is terminated. On the one hand, since the reversing roller 422 is positioned on the upper side in case the reversing sensor is turned off, the control unit returns to the Sequence 3 to execute it again. By executing the Sequence 3 again, the reversing roller 422 is positively brought to the lower position.

As described above, by executing the initializing operation, in the reversing unit 412, irrespective of whether the reversing roller 422 is initially positioned at the upper position or the lower position, the reversing roller 422 is positively brought to the lower position. Also, irrespective of whether the planetary gear unit 476 is initially positioned at the first swing position or the second swing position, the planetary gear unit 476 is positively brought to the first swing position.

Figure 30:
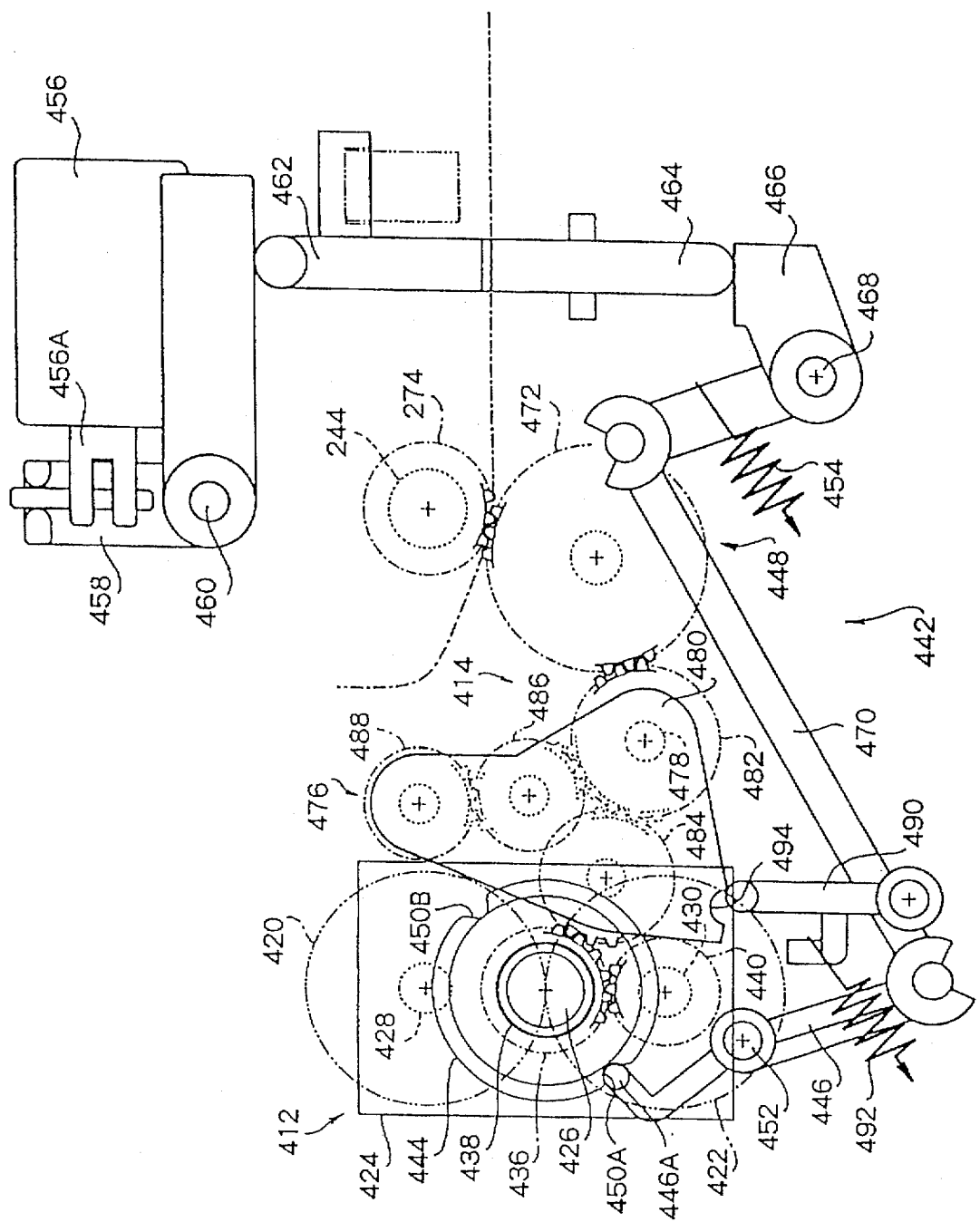
FIG. 30 is a front view for showing the structures of the reversing mechanism and the third driving power transmitting mechanism in a state of sequence 5, i.e., in a state of normal reading of a document, from the state shown in FIG. 29.

Next, referring to FIG. 30, a "normal reading operation" for reading an image on a front surface of a document is described.

As described above, since a condition shown in FIG. 29 is attained to, the electromagnetic solenoid 456 is demagnetized; the engaging portion 446A of the rotation control lever 446 is fitted into the engaging recess 450A (or, 450B); rotation of the reversing brackets 424 (i.e., revolving around the common axis) is restricted; and the planetary gear unit 476 is regulated at the first swing position, so that there is set a state where the driven gear 436 is rotated in the same direction as that of the first driving power taken-out gear 274 which is rotated in a direction opposite to the rotating direction of the driving motor 222. With this state, the reversing roller 422, as the transferring roller integrally rotated together with the driving gear 440 which is engaged with the driven gear 436, is rotated along the same direction as the rotating direction of the driving motor 222.

Under this condition, when the image reading operation is carried out, the control unit rotates the driving motor 222 in the counter-clockwise direction in the drawing. As a result, both the transferring rollers 224, 226 of the driving mechanism 204 are rotated in the clockwise direction in the drawing, and sandwiched by the back-up rollers 402, 404 which revolvingly contact with the transferring rollers 224, 226, respectively, so that the document is transferred to the left side in the drawing. Then, in the middle of transferring, the control unit executes the image reading operation of the upper surface (i.e., the front surface) of the document through the image reader 202 after an in-sensor (not shown) is turned on.

When driving motor 222 is rotated in the counter-clockwise direction in the drawing, the sun gear 482 is rotated in the counter-clockwise direction in the drawing, so that the swinging brackets 480 are swung in the clockwise direction in the drawing to thereby be brought into the lifting position, as shown in FIG. 30. Also, under the condition that the swinging brackets 480 are controlled at the lifting position, the reversing roller 422 as the transferring roller is rotated in the same direction as that of the swinging brackets 480 (Sequence 5).

Figure 31:
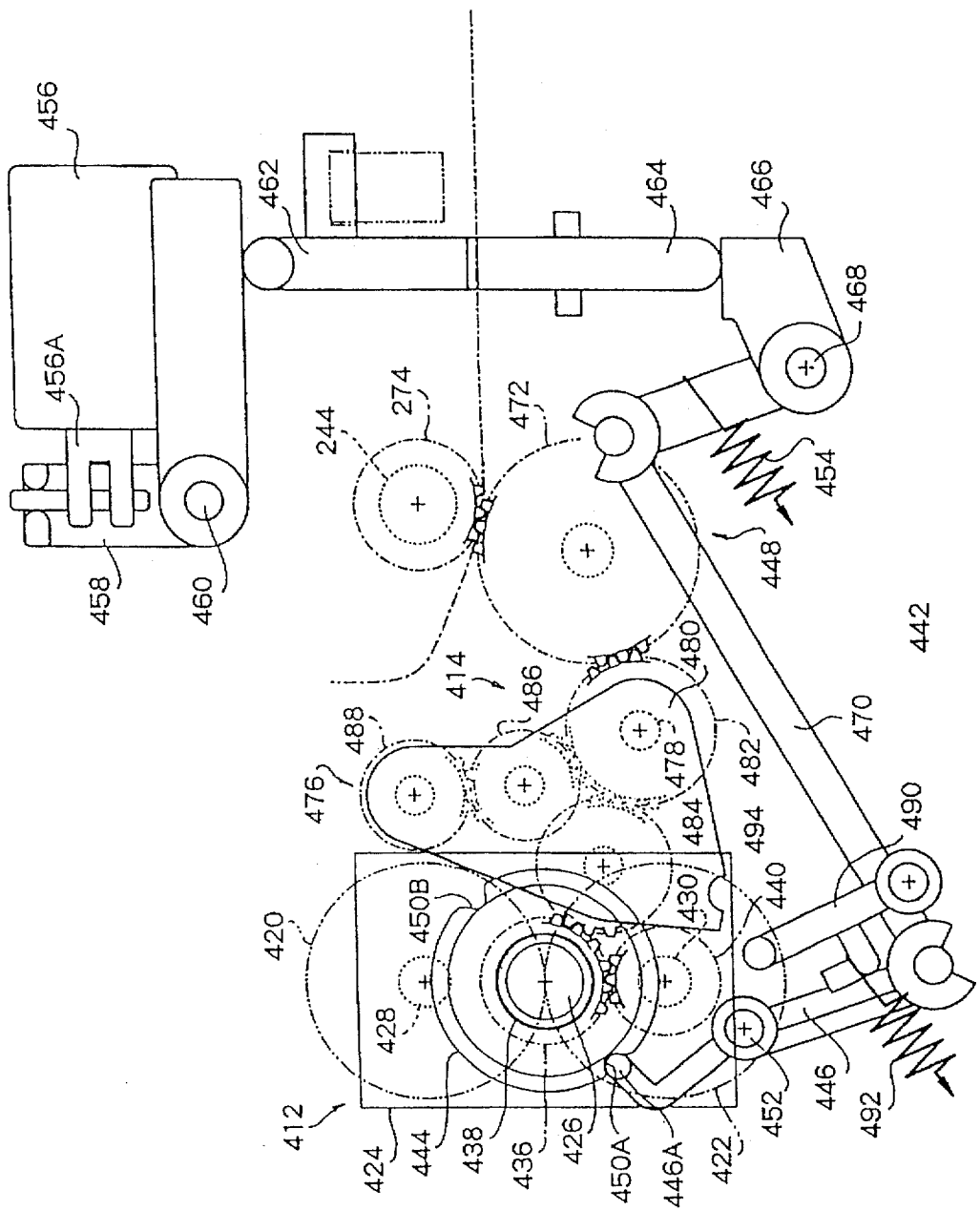
FIG. 31 is a front view for showing the structures of the reversing mechanism and the third driving power transmitting mechanism in a state where the swing control lever is rotated until it abuts against the rotation control lever from the state shown in FIG. 30.

Incidentally, since the swinging brackets 480 are swung to the lifting position, fitting the swing control lever 490 into in the locking recess 494 to regulate the swing control lever 490 at the locking position is released, so that the swing control lever 490 is rotated in the counter-clockwise direction in the drawing by the urging force of the second coil spring 492, and is terminated at a position where the swing control lever 490 abuts against the rotation control lever 446 as shown in FIG. 31.

Also, at the same time when the in-sensor is turned on, the control unit starts counting operation of, for example, 2883 steps, and rotates the driving motor 222 by the counted number. Therefore, a forward edge of the document the image of which on the front surface has been read by the image reader 202, is taken into the reversing housing 406 of the automatic document reversing device 14 through the document in-take port 416, and then is brought to the revolvingly contact portion of the reversing rollers 420 and 422. And, the document held at the revolvingly contacting portion is further transferred toward left in the drawing according to rotation of the reversing roller 422. Incidentally, when the driving motor 222 is rotated by the above mentioned 2883 steps, a rear edge of the document (i.e., a right edge in the drawing) is brought into a state where the rear edge is held between the reversing rollers 420 and 422.

Here, in case the automatic document reversing device 14 is set at a passing-through mode for executing the passing-through function, the control unit keeps rotating the driving motor 222 in the counter-clockwise direction in the drawing to thereby transfer the document toward left in the drawing, and then discharges the document to the outside from the reversing housing 406 through the document ejecting port 418. On the one hand, in case the automatic document reversing device 14 is set at a reversing mode for executing the reversing function, the following reversing operation is executed.

Next, referring to FIGS. 32 through 36, the reversing operation of a document is explained in detail.

Figure 32:
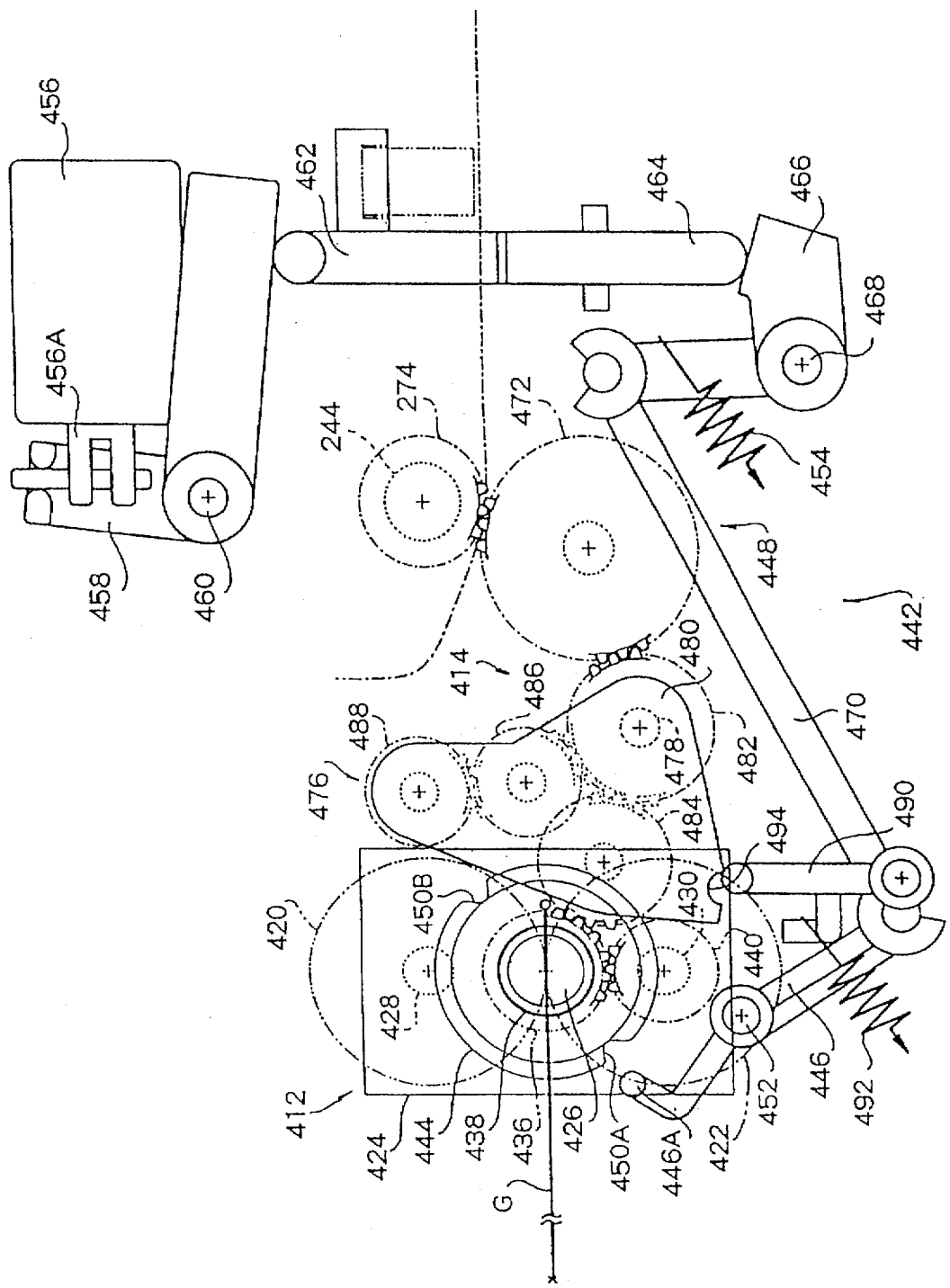
FIG. 32 is a front view for showing the structures of the reversing mechanism and the third driving power transmitting mechanism in a state of sequence 6, i.e., in a state where the normal reading of the document is completed and the rotation restriction of the reversing brackets is released from the state shown in FIG. 31.

As described above, in case the automatic document reversing device 14 is set at the reversing mode, at a time that the driving motor 222 is rotated by the above described 2883 steps to be terminated and, as shown in FIG. 32, a terminal edge (the edge portion shown by "o" in the drawing. Incidentally, a starting edge of the document is shown by "x") of the document G is held between both the reversing rollers 420 and 422, the control unit magnetizes the electromagnetic solenoid 456, and at the same time, rotates the driving motor 222 this time in the clockwise direction by, for example, 8 steps.

By magnetizing the electromagnetic solenoid 456 as described above, the rotation control lever 446 is rotated in the counter-clockwise direction in the drawing against the energizing power of the first coil spring 454, so that, as shown in FIG. 32, the engaging portion 446A of the rotation control lever 446 fitted into the one engaging recess 450A (450B) is released therefrom. Also, the swing control lever 490 is rotated in the clockwise direction in the drawing in association with the rotation of the rotation control lever 446 against the urging force of the second coil spring 492, so that the upper end of the swing control lever 490 is brought to a position right under the swinging bracket 480.

Figure 33:
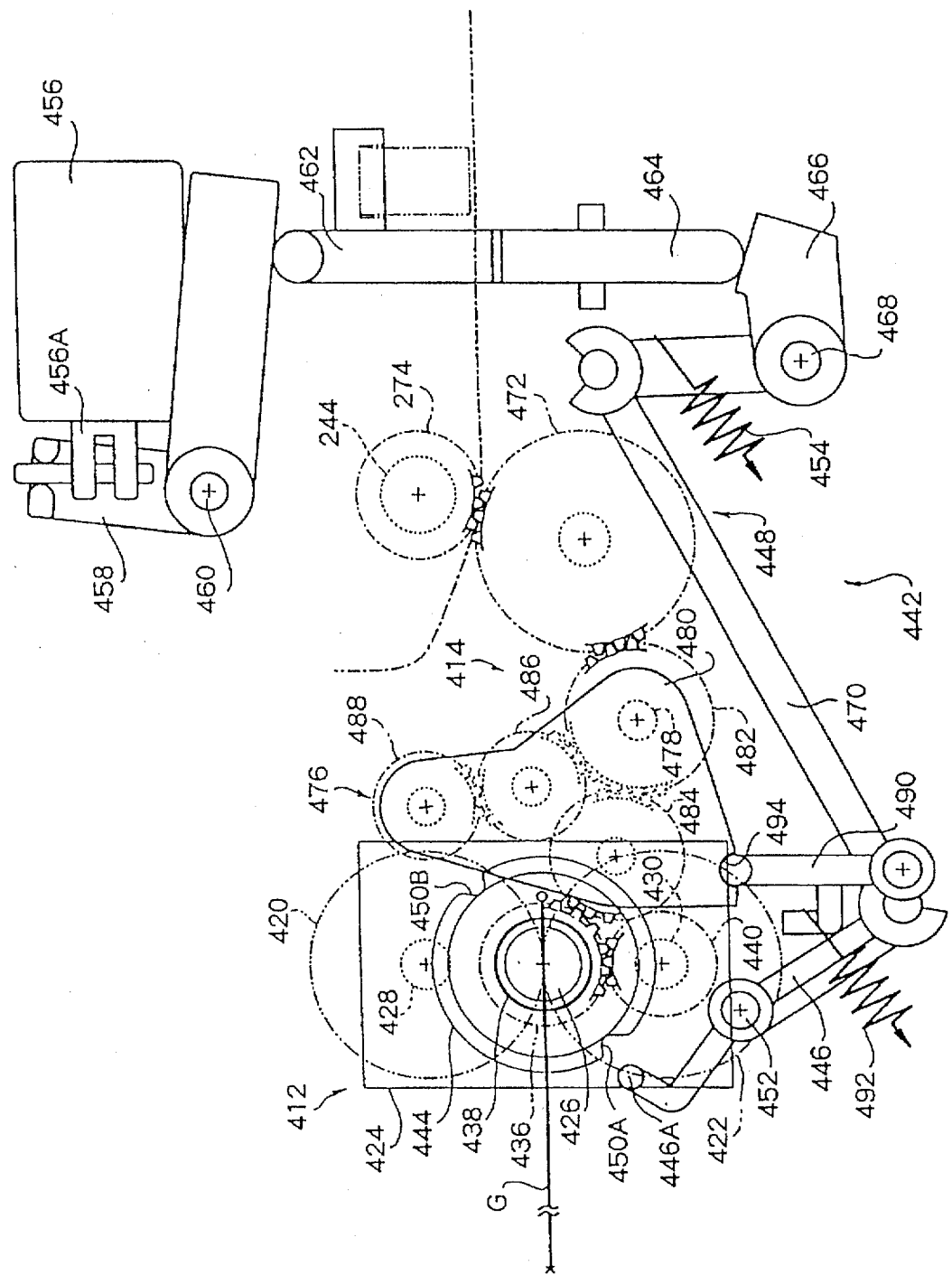
FIG. 33 is a front view for showing the structures of the reversing mechanism and the third driving power transmitting mechanism in a state where the swinging brackets are locked to the first position when reversing operation of the reversing brackets is started from the state shown in FIG. 32.

Also, with rotation of the driving motor 222 in the clockwise direction in the drawing, the swinging brackets 480 are swung in the counter-clockwise direction in the drawing, and as shown in FIG. 33, the upper end of the swing control lever 490 is fitted into the locking recess 494, so that the swinging brackets 480 are locked at the first swing position. Also, with the rotation of the driving motor 222 in the clockwise direction in the drawing, the reversing brackets 424 start the revolving operation along the counter-clockwise direction in the drawing (Sequence 6).

Figure 34:
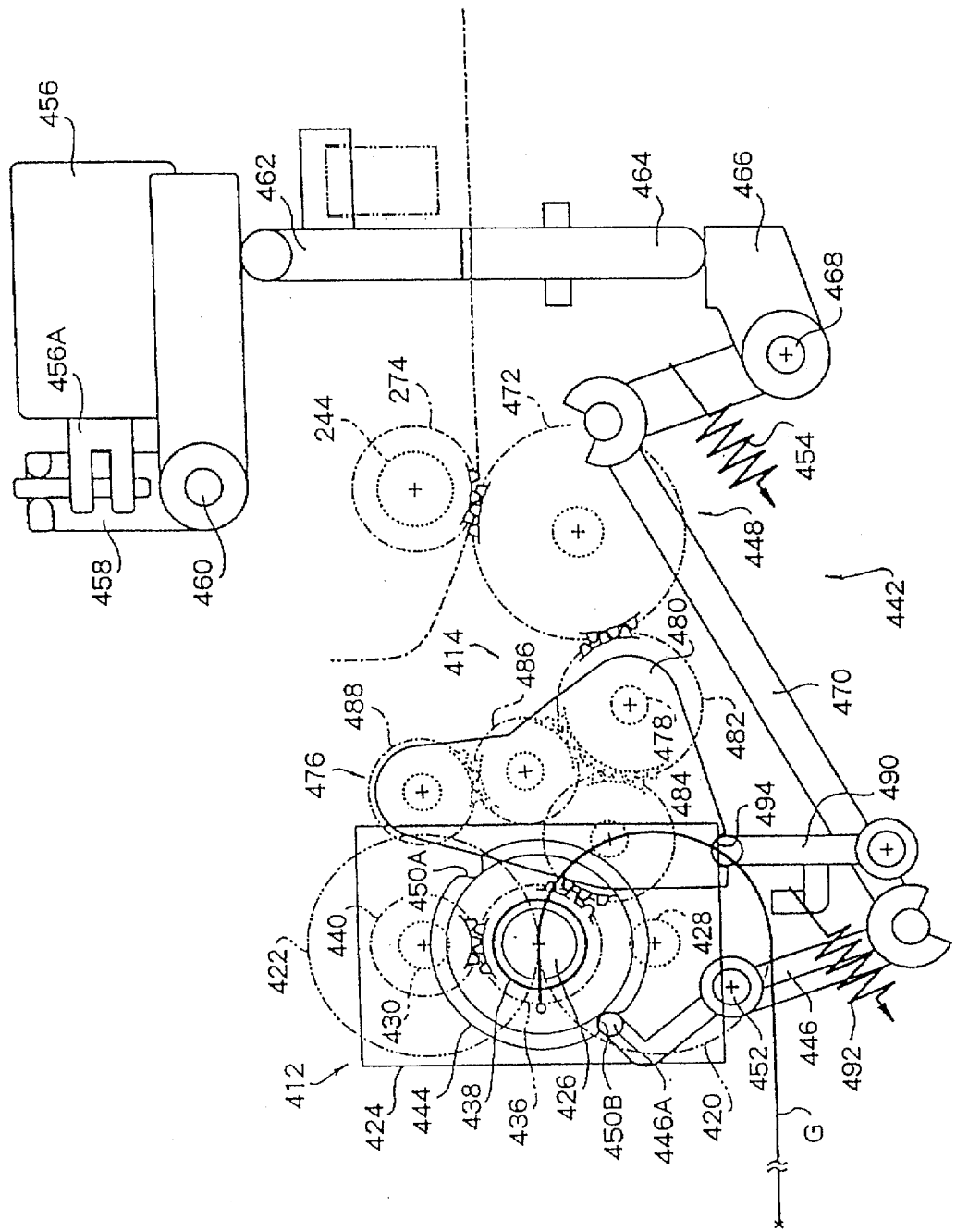
FIG. 34 is a front view for showing the structures of the reversing mechanism and the third driving power transmitting mechanism in a state of sequence 7, i.e., in a state where the reversing brackets are rotated by 180 degrees from the state shown in FIG. 33.
Figure 35:
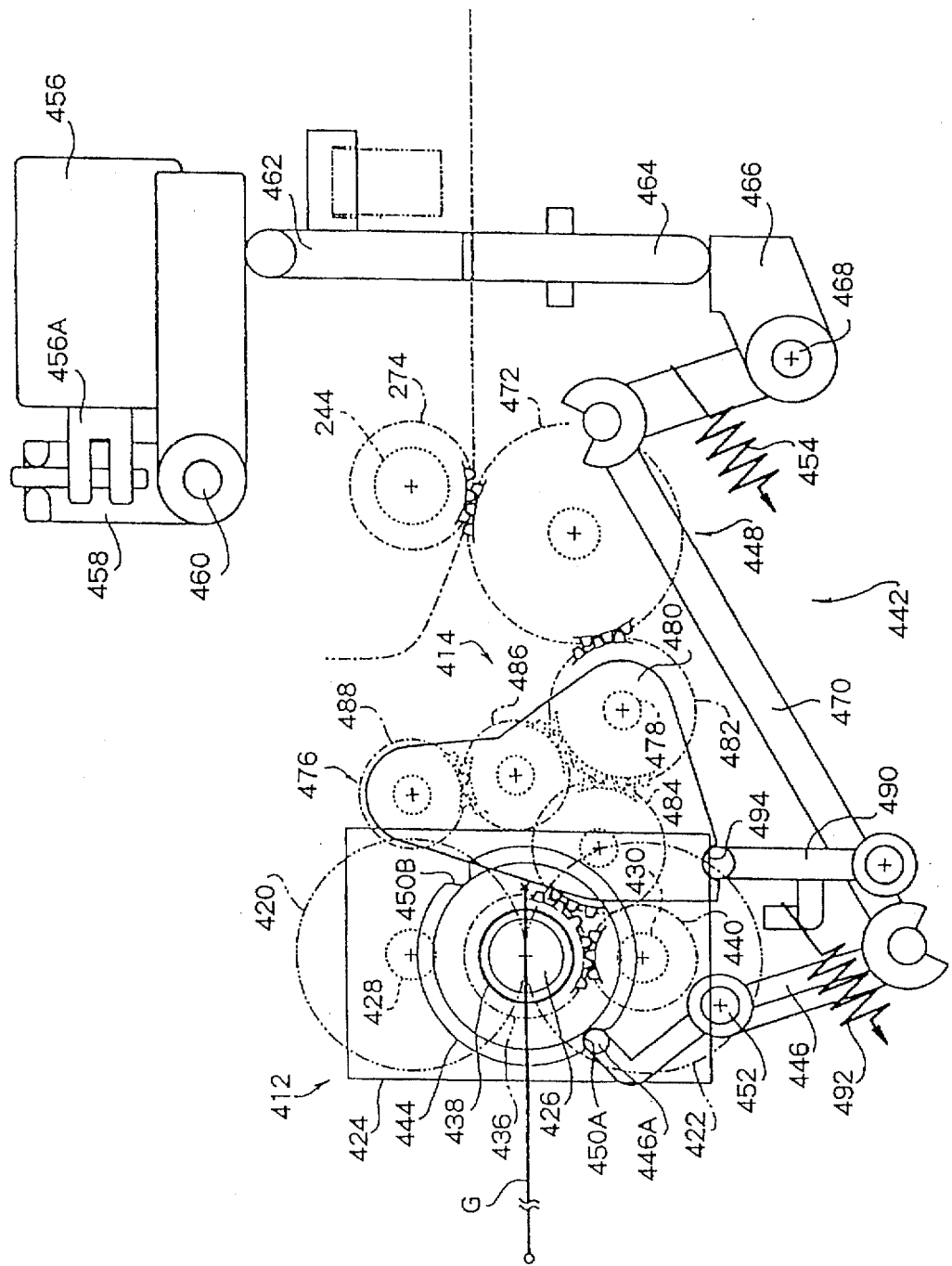
FIG. 35 is a front view for showing the structures of the reversing mechanism and the third driving power transmitting mechanism in a state of sequence 8, i.e., in a state where the reversed document is transferred to a left side and a leading edge thereof is held between both the reversing rollers from the state shown in FIG. 34.

And, when the driving motor 222 is driven by 8 steps, the control unit demagnetizes the electromagnetic solenoid 456, and from this point, further rotates the driving motor 222 in the clockwise direction in the drawing by, for example, 454 steps. With the demagnetization of the electromagnetic solenoid 456, as already explained in detail at the aforementioned explanation {of operation of the rotation control mechanism 442}, the engaging portion 446A of the rotation control lever 446 resiliently abuts against the periphery of the rotation control disc 444. On the one hand, with the rotation of 454 steps of the driving motor 222, at a time point that the engaging portion 446A of the rotation control lever 446 is fitted into the other engaging recess 450B (450A), the rotation is terminated, and accordingly, the revolving operation by the reversing brackets 424 is terminated. Incidentally, at a time point that this revolving operation is terminated, as shown in FIG. 34, the reversing brackets 424 have finished the operation of revolving around the common axis by 180 degrees, in other words, the reversing operation (Sequence 7).

Thereafter, the control unit further rotates the driving motor 222 in the clockwise direction in the drawing by, for example, 2178 steps. With this rotation, the reversing roller 424 positioned on the upper side in the drawing is rotated in the clockwise direction in the drawing, so that the document G is transferred toward left in the drawing. As described above, as shown in FIG. 35, the starting edge of the document G is held between the reversing rollers 420, 442 (Sequence 8).

Figure 36:
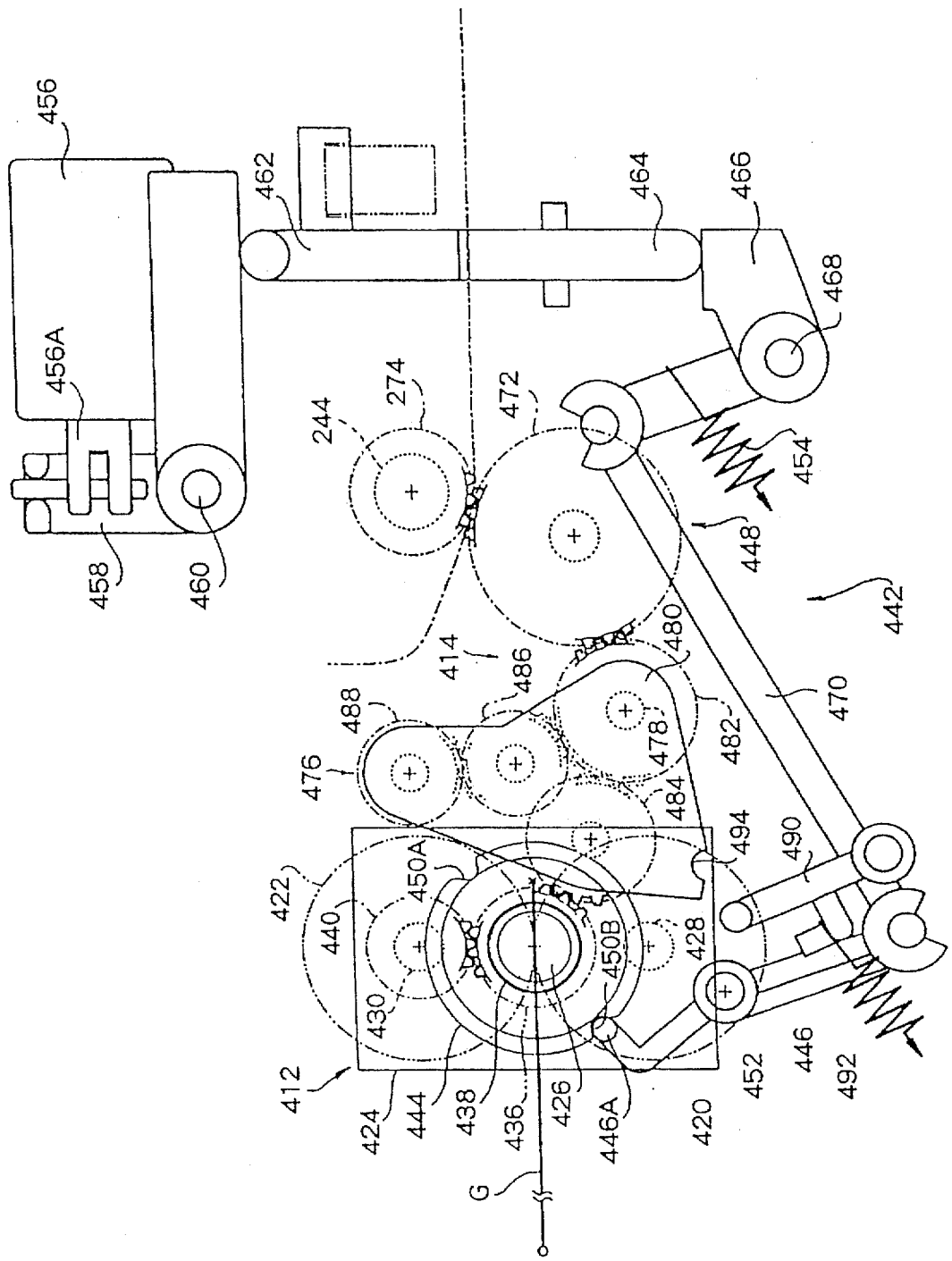
FIG. 36 is a front view for showing the structures of the reversing mechanism and the third driving power transmitting mechanism in a state of sequence 9, i.e., in a state where the swinging brackets are swung to the lifting position, and locking of the swinging bracket is released from the state shown in FIG. 35.

Then, this time, the control unit rotates the driving motor 222 by 16 steps in the counter-clockwise direction in the drawing. With this rotation, the planetary gear unit 476 is swung in the clockwise direction in the drawing to thereby be brought to the lifting position. As a result, the swing control lever 490 is rotated in the counter-clockwise direction in the drawing by the urging force of the second coil spring 492, and abuts against the rotation control lever 446, as shown in FIG. 36, so that the swing control lever 490 is released from the lower side of the swinging bracket 480 (Sequence 9).

Figure 37:
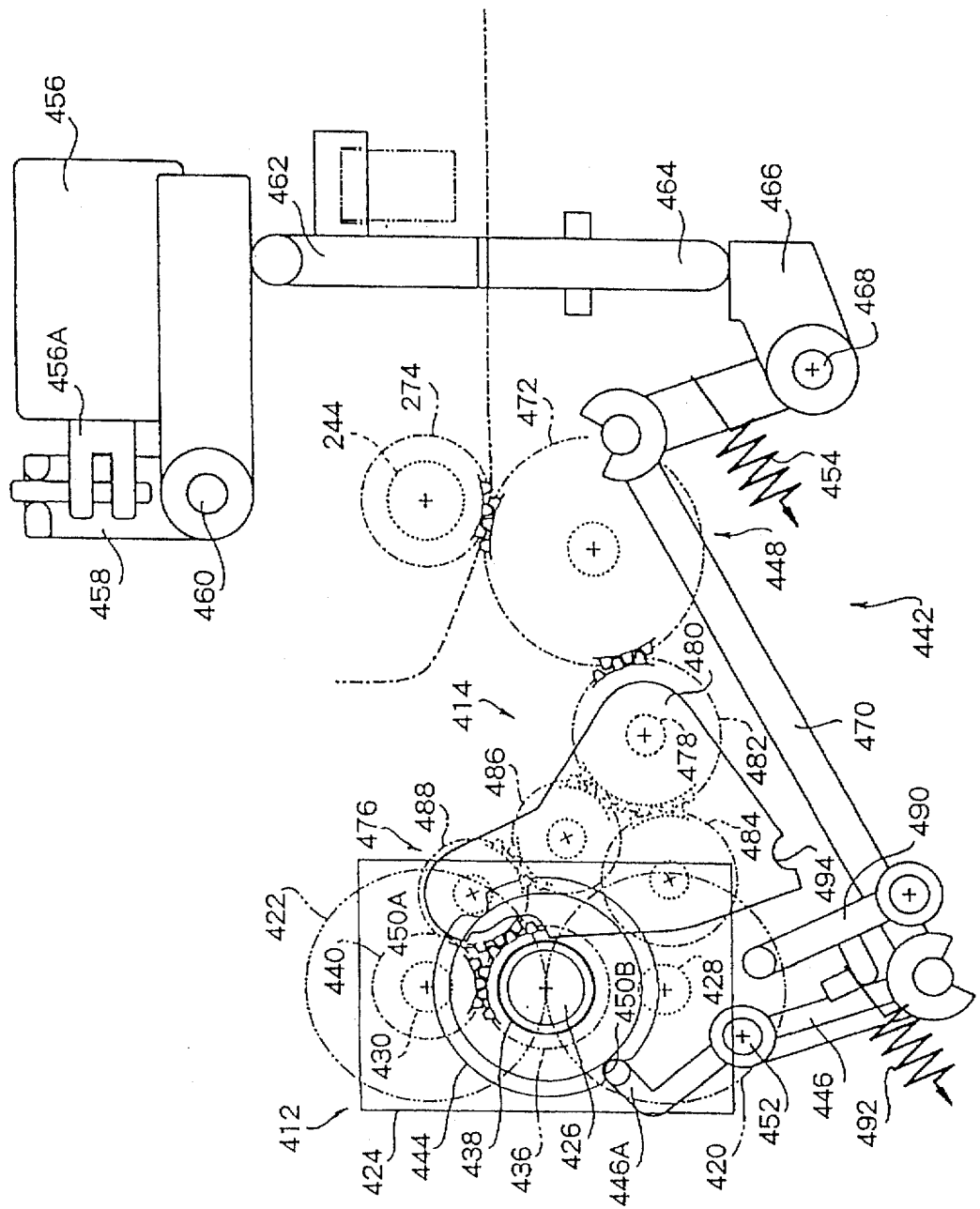
FIG. 37 is a front view for showing the structures of the reversing mechanism and the third driving power transmitting mechanism in a state of sequence 10, i.e., in a state where the swinging brackets are swung to the second swing position from the state shown in FIG. 35.

Next, referring to FIG. 37, a "reverse reading operation" for reading an image on a back surface of the document is explained.

As described above, when the state as shown in FIG. 36 is attained, the control unit rotates the driving motor 222 in the clockwise direction by, for example, 2883 steps. With this rotation, the sun gear 482 is rotated in the counter-clockwise direction in the drawing, and in cooperation therewith the planetary gear unit 476 is also rotated in the counter-clockwise direction in the drawing to thereby be brought to the second swing position as shown in FIG. 37. As a result, the driven gear 436 intermeshes with the second planetary gear 488 instead of the first planetary gear 484, so that the driven gear 436 is rotated in the same direction as the rotating direction of the driving motor 222.

More specifically, since the driving motor 222 is rotated in the clockwise direction in the drawing as described above, the driven gear 436 is also rotated in the clockwise direction in the drawing. Therefore, the reversing roller 422 integrally rotated with the driving gear 440 which is engaged with the driven gear 436 is rotated in the counter-clockwise direction in the drawing. Thus, since the reversing roller 422 positioned in the upper side is rotated in the counter-clockwise direction in the drawing, the document G is transferred toward right in the drawing, i.e. toward the scanner device 12.

Then, while the driving motor 222 is rotated by the above described 2883 steps, the reversed document G is transferred under the image reader 202 toward right in the drawing, so that the image of the upper surface of the document (i.e., the back surface of the document) is scanned by the image reader 202. Then, through the reversed document ejecting port 220 defined between the scanner device 12 and the automatic document reversing device 14, the reversed document, the back surface of which has been read is taken out from the image scanner 10 to the outside.

As described above, the control unit completes a series of control procedures for the image reading operations of the back surface of the document.

When the operation for reading the image on the back surface of the reversed document is completed, the control unit executes an initializing operation for returning the reversing unit 412 and the planetary gear unit 476 to the initial positions. The initializing operation includes operations as shown by Sequences 11 through 14 in Table 1. However, since this initializing operation is substantially the same as the initialization of the automatic document reversing device 14, i.e. the initializing operation of the reversing unit 412 and the planetary gear unit 476, as explained above by referring to FIG. 17 and FIGS. 27 through 29, explanation thereof is omitted. In short, with execution of the initializing operation, the initial state for starting the image reading operation as shown in FIG. 29 is again defined.

Figure 38:
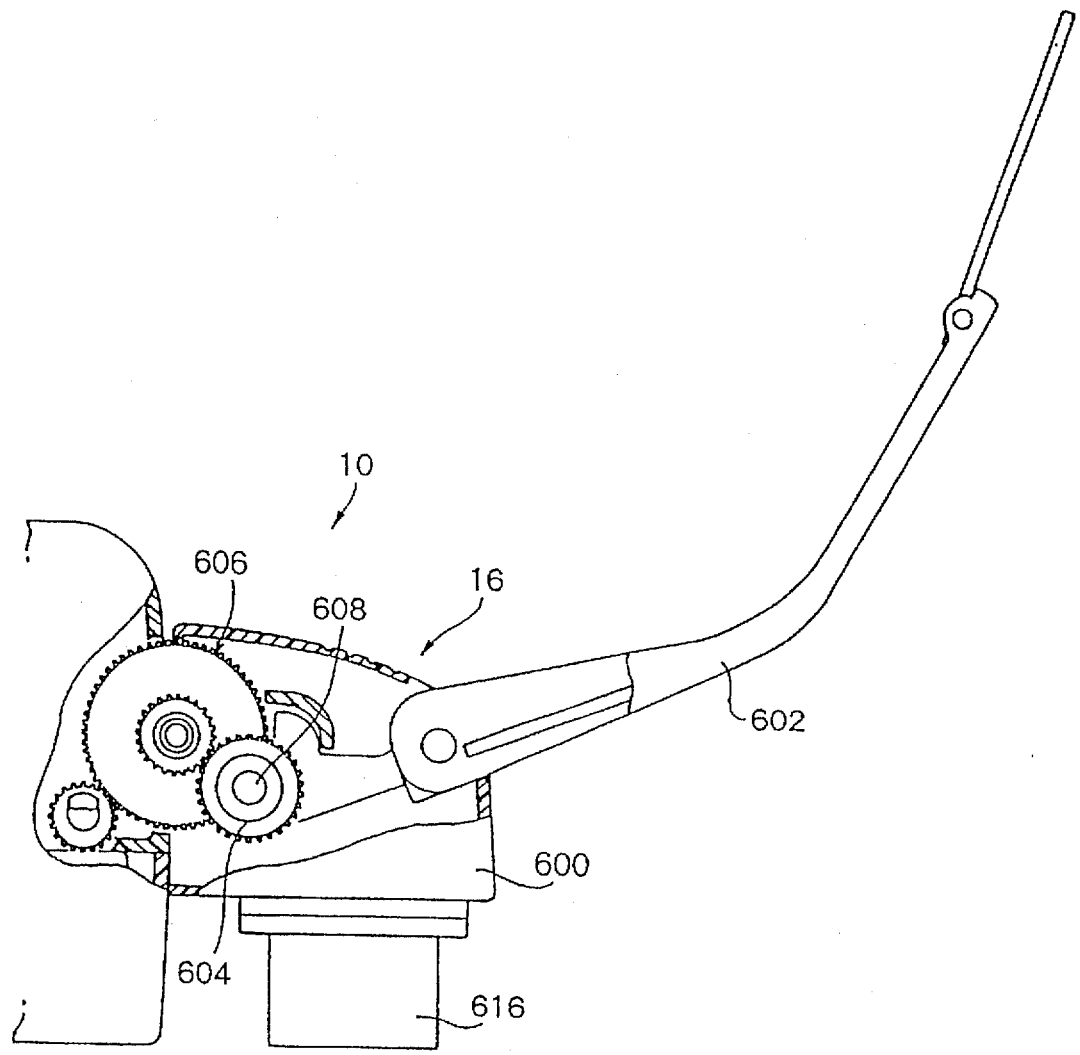
FIG. 38 is a front section view for showing an enlarged inner structure of the automatic document feeding device.
Figure 39:
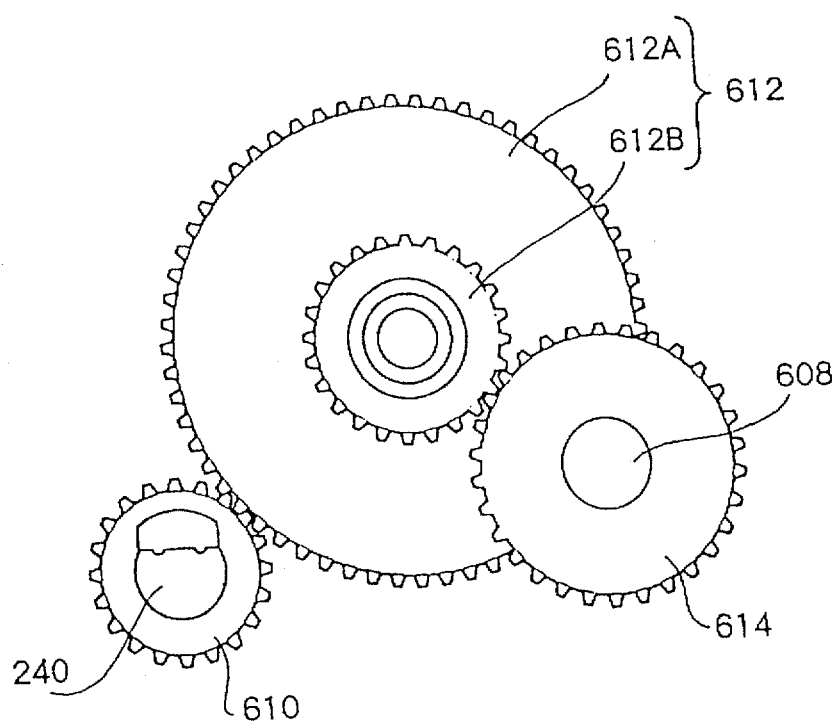
FIG. 39 is front view for showing a structure, in a taken-out state, of a fourth driving power transmitting mechanism provided in the automatic document feeding device.

Next, referring to FIGS. 38 and 39, a construction and an operation of the automatic document feeding device 16 for automatically feeding a plurality of documents to the scanner device 12 one by one are explained in detail. Incidentally, although in this embodiment, the automatic document feeding device 16 is constructed to be mounted to the scanner device 12 which is attached to the automatic document reversing device 14, the automatic document feeding device 16 can be mounted only to the scanner device 12. In this case, the document press member 400 and the pair of back-up rollers 402, 404 on the left and right sides provided to the automatic document reversing device 14 are provided in the automatic document feeding device 16.

The automatic document feeding device 16, as shown in FIG. 38, mainly includes an ADF housing 600 detachably provided to a right side of the scanner housing 200 of the scanner device 12; a document tray 602 on which documents are placed, and detachably provided to a right side of the ADF housing 600 in the drawing; a transferring roller 604 for taking out the documents placed on the document tray 602 one by one and transferring to the scanner device 12; and a fourth driving power transmitting mechanism 606 for transmitting the driving power of the driving motor 222 to the transferring roller 604 to thereby rotate thereof.

Here, a plurality of the transferring rollers 604 is coaxially fixed to a transferring shaft 608 along an axial direction, and the transferring shaft 608 is rotatably supported to the ADF housing 600.

The fourth driving power transmitting mechanism 606, as shown in FIG. 39, includes a second driving power take-out gear 610 coaxially fixed to the aforementioned first driven shaft 240 provided to the scanner device 12; a second coupling gear 612 integrally formed of a large diameter gear portion 612A projecting, at a left side portion thereof, from a left side of the ADF housing 600 and engaged with the second driving power take-out gear 610 when the ADF housing 600 is attached to the scanner housing 200, and a small diameter gear portion 612B supported coaxially with the large diameter gear portion 612A; and a driven gear 614 coaxially fixed to the transferring shaft 608 and engaged with the small diameter gear portion 612B of the second coupling gear 612.

Since the fourth driving power transmitting mechanism 606 is constructed as described above, although the automatic document feeding device 16 itself does not have a driving source, when the automatic document feeding device 16 is attached to the scanner device 12, the large diameter gear portion 612A of the second coupling gear 612 intermeshes with the second driving power take-out gear 610 provided on the side of the scanner device 12. Through engaging the large diameter gear portion 612A with the second driving power take-out gear 610, the driven gear 614 receives the driving power from the driving motor 222 as the driving source built in the scanner device 12 sequentially through the first and fourth driving power transmitting mechanisms 228 and 606, so that the transferring rollers 604 adapted to integrally rotate together with the driven gear 614 are rotated.

More specifically, when the driving motor 222 is rotated in the counter-clockwise direction in the drawing, the driven gear 238 (accordingly, the first driven shaft 240 integrally rotated therewith) is rotated in the clockwise direction in the drawing, and through the second coupling gear 612 engaged with the second driving power take-out gear 610 provided to the first driven shaft 240 to thereby integrally rotate therewith, the driven gear 614 (accordingly, the transferring roller 604 integrally rotated therewith) is rotated in the clockwise direction in the drawing. In accordance with the rotation of the transferring roller 604 in the clockwise direction, at least one sheet out of the documents placed on the document tray 602 is transferred (i.e., sent out) toward the scanner device 12 one by one.

Here, when the automatic document feeding device 16 is mounted to the scanner device 12, as shown in FIG. 38, there is formed a large gap between a lower surface of the ADF housing 600 and an installation surface of an installation table (not shown) on which the automatic document reversing device 14 mounted to the scanner device 12 is installed. In other words, a lower surface of the automatic document feeding device 16 is positioned above the installation surface of the installation table. Therefore, in order to stably keep a mounted state of the automatic document feeding device 16 mounted to the scanner device 12, a collapsible stand 616 is provided under the lower surface of the ADF housing 600.

When the holding type stand 616 is extended in an upright state, the automatic document feeding device 16 mounted to the scanner device 12 is stably supported by the installation surface of the installation table. Also, by collapsing the stand 616, an outer shape when the automatic document feeding device 16 is not used (for example, when stored), can be compact.

It should be noted that the present invention is not limited to the construction of the above described embodiment, and the present invention can be modified variously within a scope of the gist of the present invention.

For example, although a case in which the image reading device according to the present invention is applied to the image scanner has been described in the aforementioned embodiment, the present invention is not limited thereto, and it is needless to say that the present invention can be also applied to a copier having a copying function. Also, the present invention can be applied to a facsimile device having a transmission function.

As described above in detail, an image reading apparatus of the present invention, according to a first aspect, comprises a main portion having an image reading function; a driving source built in the main portion; reversing means detachably provided with the main portion and capable of reversing a document fed from the main portion in the state where the main portion is mounted thereto; and driving power transmitting means for transmitting a driving power from the driving power source under a condition that the main portion is mounted to the reversing means to thereby drive the reversing means.

Also, in the image reading apparatus of the present invention, according to a second aspect, the main portion includes moving rollers rotated by the driving source, and under a condition that the main portion is used alone, the main portion is self-moved by rotation of the moving rollers.

Also, in the image reading apparatus of the present invention, according to a third aspect, the main portion includes transferring rollers rotated by the driving source, and under a condition that the main portion is mounted to the reversing means, the document is transferred by rotation of the transferring rollers.

Also, in the image reading apparatus of the present invention, according to a fourth aspect, the transferring roller comprises a pair of transferring rollers spaced apart along a direction where a document is transferred, and the driving power transmitting means includes first driving power transmitting means for transmitting the driving power of the driving source to one of the pair of transferring rollers; second driving power transmitting means for transmitting the driving power transmitted to one of the pair of transferring rollers to the other thereof; and third driving power transmitting means for transmitting the driving power transmitted to the other transferring roller to the reversing means.

Also, in the image reading apparatus of the present invention, according to a fifth aspect, the third driving power transmitting means includes a first driving power take-out gear coupled to the other of the transferring rollers to integrally rotate therewith; and a first coupling gear engaged with the first driving power take-out gear when the main portion is mounted to the reversing means.

Also, in the image reading apparatus of the present invention, according to a sixth aspect, the driving power transmitting means includes a first coupling gear coupled to the driving source in a state where the driving power can be transmitted when the main portion is mounted to the reversing means, and in a state where the first coupling gear is built in the reversing means.

Also, in the image reading apparatus of the present invention, according to a seventh aspect, the reversing means includes a reversing unit having a pair of reversing rollers which revolvingly contact with each other, reversing the document transferred from the main portion, and returning the reversed document to the main portion; and the third driving power transmitting means for reversibly transmitting the driving power transmitted to the first coupling gear from the driving source to the reversing unit.

Also, in the image reading apparatus of the present invention, according to a eigth aspect, the reversing unit includes reversing brackets rotatably supporting both the reversing rollers, respectively; a supporting shaft for rotatably supporting the reversing brackets at an intermediate position of both the reversing rollers as a rotation center; a driven gear coaxially mounted to the supporting shaft through friction engagement means; a driving shaft to which one of the reversing rollers is coaxially fixed, and which is rotatably supported by the reversing brackets; and a driving gear coaxially fixed to the driving shaft and always engaged with the driven gear, so that the third driving power transmitting means transmits the driving power to the driven gear.

Also, in the image reading apparatus of the present invention, according to a ninth aspect, the reversing unit includes rotation control means for controlling a rotation condition of the supporting shaft, wherein under a condition that the rotation control means controls the supporting shaft not to rotate, in case the driven gear is rotated through the third driving power transmitting means, the pair of transferring rollers is rotated around their own central axes, respectively; and under a condition that the rotation control means controls the supporting shaft to rotate, in case the driven gear is rotated through the third driving power transmitting means, the pair of transferring rollers is revolved around the common supporting shaft.

Also, in the image reading apparatus of the present invention, according to a tenth aspect, the rotation control means includes a rotation control disc fixed to a periphery of the supporting shaft and provided with a pair of engaging recesses on a periphery thereof spaced apart in a diametral direction; a rotation control lever swingably disposed so as to detachably engage with the engaging recesses of the rotation control disc; urging means for urging the rotation control lever to fit into the engaging recess; swinging means for swinging the rotation control lever; and control means for swinging the swinging means so that in case the rotation of the supporting shaft is restricted, the rotation control lever fits into one of the engaging recesses, and in case the rotation of the supporting shaft is allowed, the rotation control lever is released from the engaging recess.

Also, in the image reading apparatus of the present invention, according to an eleventh aspect, the swinging means includes an electromagnetic solenoid built in the main portion and switchable to a magnetized state or a demagnetized state by the control means; a first coupling lever built in the main portion and moved when the electromagnetic solenoid is magnetized; and coupling means built in the reversing means, coupled to the first coupling lever in a state where the main portion is mounted to the reversing means, and transmitting the movement of the first coupling lever to the rotation control lever to swing the rotation control lever, wherein in case rotation of the supporting shaft is restricted, the control means demagnetizes the electromagnetic solenoid to thereby swing the rotation control lever to fit one of the engaging recesses, and in case the rotation of the supporting shaft is allowed, the control means magnetizes the electromagnetic solenoid to thereby swing the rotation control lever to be released from the engaging recess against an urging force of the urging means.

Also, in the image reading apparatus of the present invention, according to a twelfth aspect, the third driving power transmitting mechanism is provided between the first coupling gear and the driven gear, and includes a planetary gear unit for reversibly changing rotating directions of rotation driving power transmitted to the driven gear.

Also, in the image reading apparatus of the present invention, according to a thirteenth aspect, the planetary gear unit includes swinging brackets; a supporting shaft for swingably supporting the swinging brackets; a sun gear rotatably supported by the supporting shaft and at the same time frictionally engaging the swinging brackets through friction engaging means; a first planetary gear always engaging with the sun gear and also being intermeshable with the driven gear; and a second planetary gear always engaging with the sun gear through an intermediate gear and also being intermeshable with the driven gear; wherein the swinging brackets include a first swing position where the first planetary gear intermeshes with the driven gear and a second swing position where the second planetary gear intermeshes with the driven gear to thereby be swingable.

Also, in the image reading apparatus of the present invention, according to a fourteenth aspect, the third driving power transmitting means includes a swing control lever swingable between a locking position for locking the swinging brackets at the first swing position and a retreating position for allowing the swinging brackets to swing from the first swing position to the second swing position; and second urging means for urging the swing control lever to swing toward the retreating position; wherein the retreating position is defined when the swing control lever abuts against the rotation control lever.

Also, the image reading apparatus of the present invention, according to a fifteenth aspect, further comprises document feeding means detachably mounted to the main portion and for automatically feeding documents to the main portion under a condition that the document feeding means is mounted to the main portion; and fourth driving power transmitting means for receiving a divided part of the driving power from the driving power transmitting means under a condition that the document feeding means is mounted to the main portion to thereby drive the document feeding means.

Also, in the image reading apparatus of the present invention, according to a sixteenth aspect, the main portion includes a pair of transferring rollers spaced apart along a transferring direction of a document, and the driving power transmitting means includes first driving power transmitting means for transmitting driving power of the driving source to one of the pair of transferring rollers.

Also, in the image reading apparatus of the present invention, according to a seventeenth aspect, the fourth driving power transmitting means includes a second driving power take-out gear provided in the main portion and coupled to the one of the transferring rollers to integrally rotate therewith; and a second coupling gear built in the document feeding means and engaged with the second driving power take-out gear when the document feeding means is mounted to the main portion.

Also, in the image reading apparatus of the present invention, according to an eighteenth aspect, the fourth driving power transmitting means includes the second coupling gear coupled to the driving power transmitting means to be able to transmit the driving power when the document feeding means is mounted to the main portion, in a state where the second coupling gear is built in the document feeding means.

Also, in the image reading apparatus of the present invention, according to a nineteenth aspect, document feeding means for supplying documents to the main portion is detachably mounted to the main portion.

Also, in the image reading apparatus of the present invention, according to a twentieth aspect, the document feeding means is mounted to the main portion under a condition that the main portion is attached to the reversing means.

Therefore, according to the present invention, although the document reversing device is not provided with a driving source, since the document reversing device is constructed to be driven by receiving the driving power from the driving source in the main portion under a condition that the document reversing device is attached to the main portion, it is possible to provide an image reading apparatus wherein the whole construction is simplified and the cost is reduced.

Also, according to the present invention, when the scanner device and the document reversing device are coupled, since both of them are not required to be electrically connected, it is possible to provide an image reading apparatus wherein workability for the coupling work is improved.

Also, according to the present invention, although the document feeding device is not provided with a driving source, since the document feeding device is constructed to receive the driving power from the driving source in the main portion under a condition that the document feeding device is mounted to the main portion, it is possible to provide an image reading apparatus in which the whole construction is simplified and the cost is reduced.

What is claimed is:

1. An image reading apparatus comprising:

a main portion having an image reading function;

a driving source provided in the main portion;

reversing means, on which said main portion is detachably mounted, said reversing means having means to reverse a document fed from said main portion in a state where the main portion is mounted thereto and return the document back to the main portion; and driving power transmitting means to be connected to the driving source, said driving power transmitting means driving said reversing means by transmitting a driving power from said driving source under a condition that said main portion is mounted on the reversing means.

2. An image reading apparatus as claimed in claim 1, wherein said main portion includes moving rollers rotated by said driving source, said main portion being self-moved on a document by said moving rollers in a state where said main portion is used alone and reading an image of the document.

3. An image reading apparatus as claimed in claim 1, wherein said main portion includes transferring rollers rotated by the driving source, said main portion reading an image of the document while the document is transferred by said transferring rollers and said reversing means under the condition that the main portion is mounted on the reversing means.

4. An image reading apparatus as claimed in claim 1, wherein said driving power transmitting means includes a first coupling gear coupled to the driving source to thereby transmit the driving power when the main portion is mounted to the reversing means, said first coupling gear being built in the reversing means.

5. An image reading apparatus as claimed in claim 1, further comprising:

document feeding means detachably mounted to the main portion, said document feeding means automatically feeding documents to the main portion under a condition that the document feeding means is mounted to the main portion; and additional driving power transmitting means for receiving a part of the driving power from the driving power transmitting means under the condition that the document feeding means is mounted to the main portion to thereby drive the document feeding means.

6. An image reading apparatus as claimed in claim 1, further comprising document feeding means for supplying documents to the main portion, said document feeding means being detachably mounted to the main portion in a state that the main portion is mounted to the reversing means.

7. An image reading apparatus as claimed in claim 1, wherein said reversing means includes means to allow the document fed from the main portion to pass therethrough without reversing, said means to allow the document to pass and said means to reverse the document being switchable.

8. An image reading apparatus comprising:

a main portion having an image reading function and transferring rollers, said transferring rollers comprising a pair of transferring rollers spaced apart along a direction in which a document is transferred;

a driving source provided in the main portion, said transferring rollers being rotated by the driving source;

reversing means, on which said main portion is detachably mounted, said reversing means being capable of reversing the document fed from said main portion by rotation of the transferring rollers in a condition that the main portion is mounted on the reversing means; and driving power transmitting means to be connected to the driving source for driving said reversing means by transmitting a driving power from said driving source under a condition that said main portion is mounted on the reversing means, said driving power transmitting means including first driving power transmitting means for transmitting the driving power of the driving source to one of the pair of the transferring rollers; second driving power transmitting means for transmitting the driving power transmitted to said one of the pair of transferring rollers to the other thereof; and third driving power transmitting means for transmitting the driving power transmitted to the other transferring roller to said reversing means.

9. An image reading apparatus as claimed in claim 8, wherein said third driving power transmitting means includes:

a first driving power take-out gear coupled to the other transferring roller to integrally rotate therewith; and a first coupling gear provided in the reversing means and engaged with the first driving power take-out gear when the main portion is mounted to the reversing means.

10. An image reading apparatus as claimed in claim 9, wherein said reversing means includes a reversing unit having a pair of reversing rollers which revolvingly contact with each other, the reversing unit reversing the document transferred from the main portion by revolving the reversing unit in a condition that the document is held between the reversing rollers and returning the reversed document to the main portion, said third driving power transmitting means reversibly transmitting the driving power transmitted to the first coupling gear from the driving source toward the reversing unit.

11. An image reading apparatus as claimed in claim 10, wherein said reversing unit includes:

reversing brackets for rotatably supporting both reversing rollers, respectively;

a supporting shaft rotatably supporting the reversing brackets to freely rotate on an intermediate position of both reversing rollers as a rotation center;

a driven gear coaxially mounted to the supporting shaft through friction engagement means;

a driving shaft to which one of the reversing rollers is coaxially fixed, and which is rotatably supported by the reversing brackets; and a driving gear coaxially fixed to the driving shaft and always engaged with the driven gear, said third driving power transmitting means transmitting the driving power to the driven gear.

12. An image reading apparatus as claimed in claim 11, wherein said reversing unit includes rotation control means for controlling a rotating condition of the supporting shaft, said rotation control means controlling such that in case the supporting shaft is subjected not to rotate, when the driven gear is rotated through the third driving power transmitting means, said pair of transferring rollers is respectively rotated on their own axes; and in case the supporting shaft is subjected to rotate, when the driven gear is rotated through the third driving power transmitting means, said pair of transferring rollers is revolved around said supporting shaft.

13. An image reading apparatus as claimed in claim 12, wherein said rotation control means includes:

a rotation control disc fixed to a periphery of the supporting shaft and provided with a pair of engaging recesses on a periphery thereof spaced apart in a diametral direction;

a rotation control lever swingably disposed so as to detachably engage with the engaging recesses of the rotation control disc;

urging means for urging the rotation control lever to fit into the engaging recess;

swinging means for swinging the rotation control lever; and control means for swinging the swinging means so that the rotation control lever fits into one of the engaging recesses in case rotation of the supporting shaft is restricted, and for swinging the swinging means so that the rotation control lever is released from the engaging recess in case the rotation of the supporting shaft is allowed.

14. An image reading apparatus as claimed in claim 13, wherein said swinging means includes:

an electromagnetic solenoid provided in the main portion and being switchable to one of a magnetized state and a demagnetized state by the control means;

a first coupling lever provided in the main portion and moved when the electromagnetic solenoid is magnetized; and coupling means provided in the reversing means, coupled to the first coupling lever in a state where the main portion is mounted to the reversing means, and transmitting movement of the first coupling lever to the rotation control lever so as to swing the rotation control lever, said control means demagnetizing the electromagnetic solenoid when the rotation of the supporting shaft is restricted to thereby swing the rotation control lever to fit into one of the engaging recesses by an urging force of the urging means, and the control means magnetizing the electromagnetic solenoid when the rotation of the supporting shaft is allowed to thereby swing the rotation control lever to be released from said one of the engaging recesses against the urging force of the urging means.

15. An image reading apparatus as claimed in claim 11, wherein the third driving power transmitting mechanism includes a planetary gear unit for reversibly changing a rotating direction of the driving power transmitted to the driven gear.

16. An image reading apparatus as claimed in claim 15, wherein said planetary gear unit includes:

swinging brackets;

a supporting shaft for swingably supporting the swinging brackets;

a sun gear rotatably supported by the supporting shaft and also frictionally engaging with the swinging brackets through friction engaging means;

a first planetary gear always engaged with the sun gear and also being intermeshable with the driven gear; and a second planetary gear always engaged with the sun gear through an intermediate gear and also being intermeshable with the driven gear, said swinging brackets including a first swing position where the first planetary gear intermeshes with the driven gear and a second swing position where the second planetary gear intermeshes with the driven gear to thereby be swingable.

17. An image reading apparatus as claimed in claim 16, wherein said third driving power transmitting means includes: a swing control lever swingable between a locking position for locking the swinging brackets at the first swing position and a retreating position for allowing the swinging brackets to swing from the first swing position to the second swing position; and second urging means for urging the swing control lever to swing toward the retreating position, said retreating position being defined by the swing control lever abutting against a rotation control lever of rotation control means of the reversing means.

18. An image reading apparatus comprising:

a main portion having an image reading function, said main portion including a pair of transferring rollers spaced apart along a transferring direction of a document;

a driving source provided in the main portion;

reversing means, on which said main portion is detachably mounted, said reversing means being capable of reversing the document fed from said main portion in a state where the main portion is mounted on the reversing means;

driving power transmitting means for driving said reversing means by transmitting a driving power from said driving source under the condition that said main portion is mounted on the reversing means, said driving power transmitting means including first driving power transmitting means for transmitting the driving power of the driving source to one of the pair of transferring rollers, document feeding means detachably mounted to the main portion, said document feeding means automatically feeding documents to the main portion under a condition that the document feeding means is mounted to the main portion; and additional driving power transmitting means for receiving a part of the driving power from the driving power transmitting means under the condition that the document feeding means is mounted to the main portion to thereby drive the document feeding means.

19. An image reading apparatus as claimed in claim 18, wherein said additional driving power transmitting means includes a driving power take-out gear provided in the main portion and coupled to said one of the transferring rollers to integrally rotate therewith; and a coupling gear provided in the document feeding means and engaged with the driving power take-out gear when the document feeding means is mounted to the main portion.

20. An image reading apparatus as claimed in claim 18, wherein said additional driving power transmitting means includes a coupling gear in the document feeding means, said coupling gear being coupled to the driving power transmitting means to be able to transmit the driving power when the document feeding means is mounted to the main portion.

* * * * *